| United States Patent [19] | [11] 3,929,784 |
|---|---|
| Richards | [45] Dec. 30, 1975 |

[54] 2-AMINOALKYL TETRAHYDROQUINOLINES

[75] Inventor: Hugh Colin Richards, Canterbury, England

[73] Assignee: Pfizer Inc., New York, N.Y.

[22] Filed: Mar. 18, 1974

[21] Appl. No.: 451,980

Related U.S. Application Data

[60] Division of Ser. No. 139,955, May 3, 1971, which is a continuation-in-part of Ser. No. 732,850, May 29, 1968, abandoned.

[30] Foreign Application Priority Data

June 10, 1967 United Kingdom............... 26893/67

[52] U.S. Cl. .................. 260/247.5 GP; 260/288 R; 260/288 CE; 424/248; 424/258
[51] Int. Cl.² .......................................... C07D 215/38
[58] Field of Search . 260/288 R, 288 CE, 247.5 GP

[56] References Cited
UNITED STATES PATENTS

| 2,233,970 | 3/1941 | Andersag ........................ 260/288 R |
| 2,684,965 | 7/1954 | Weston ........................... 260/288 R |
| 3,362,956 | 1/1968 | Archer ........................... 260/268 BC |
| 3,379,620 | 4/1968 | Archer et al. ................. 260/268 PH |
| 3,452,026 | 6/1969 | Perron .............................. 260/288 |
| 3,454,579 | 7/1969 | Wright ........................... 260/288 R |
| 3,494,922 | 2/1970 | Wright ........................... 260/288 R |
| 3,622,457 | 11/1971 | Pennis .......................... 260/268 BQ |

FOREIGN PATENTS OR APPLICATIONS

| 2,007,345 | 9/1970 | Germany ........................ 260/288 R |
| 4,026,427 | 11/1965 | Japan ................................ 260/288 |
| 537,187 | 10/1961 | Germany ........................... 260/288 |

OTHER PUBLICATIONS

Nagata; Chem. Abstr. Vol. 55 Col. 5516q 1961.
Leonard; Chem. Abstr. Vol. 46 Col. 3055, 1952.

*Primary Examiner*—Richard J. Gallagher
*Assistant Examiner*—Mary C. Vaughn
*Attorney, Agent, or Firm*—Connolly and Hutz

[57] ABSTRACT

Novel 2-aminoalkyl-7-substituted-1,2,3,4-tetrahydroquinoline compounds, useful as effective anti-schistosomal agents, are disclosed and suitable modes of preparation are described. These compounds all possess either nitro, cyano or halogen substituted at the 7-position of the molecule, in addition to having a methyl, hydroxymethyl, alkoxymethyl or formyl group located at the adjacent 6-position.

7 Claims, No Drawings

2-AMINOALKYL TETRAHYDROQUINOLINES

CROSS REFERENCE TO RELATED APPLICATION

This application is a division of application Ser. No. 139,955 filed May 3, 1971, which, in turn, is a continuation-in-part of application Ser. No. 732,850 filed May 29, 1968 and now abandoned.

BACKGROUND OF THE INVENTION

This invention relates to certain novel therapeutic agents. More particularly, it relates to novel 2-aminoalkyl tetrahydroquinolines and their effectiveness in the treatment of schistosomiasis.

SUMMARY OF THE INVENTION

Accordingly, the present invention discloses compounds having the formula:

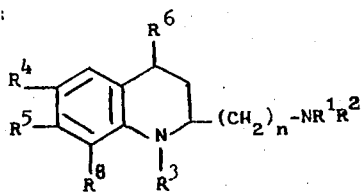

and the pharmaceutically acceptable acid addition salts thereof, wherein $R^1$ and $R^2$, when taken separately, are each selected from the group consisting of hydrogen, alkyl having from 1 to 5 carbon atoms, β-hydroxyethyl and cycloalkyl having from 3 to 6 carbon atoms; $R^1$ and $R^2$, when taken together, complete a ring selected from the group consisting of pyrrolidino, piperidino, morpholino, thiomorpholino, piperazino, N-β-hydroxyethylpiperazino and N-alkylpiperazino having from 1 to 6 carbon atoms in the alkyl moiety; $R^3$ is selected from the group consisting of hydrogen, methyl and ethyl; $R^4$ is selected from the group consisting of methyl, hydroxymethyl, alkoxymethyl having from 1 to 6 carbon atoms in the alkoxy moiety, and formyl; $R^5$ is selected from the group consisting of nitro, cyano, fluorine, chlorine and bromine; $R^6$ is hydrogen or methyl; $R^8$ is hydrogen or methyl and n is 1 or 2, and the N-oxide derivatives of said base compounds wherein $R^1$ and $R^2$, when taken separately, are each other than hydrogen.

A particularly preferred embodiment of the present invention concerns compounds of the aforesaid structural formula where $R^3$ is hydrogen, $R^4$ is methyl, hydroxymethyl or ethoxymethyl, $R^5$ is nitro, $R^6$ and $R^8$ are hydrogen and n is 1. Illustrative examples of these compounds include 2-(N,N-diethylaminomethyl)-6-methyl-7-nitro-1,2,3,4-tetrahydroquinoline, 2-(N-ethylaminomethyl)-6-methyl-7-nitro-1,2,3,4-tetrahydroquinoline, 2-isopropylaminomethyl-6-methyl-7-nitro-1,2,3,4-tetrahydroquinoline, 2-(N-sec.-butylaminomethyl)-6-methyl-7-nitro-1,2,3,4-tetrahydroquinoline, 2-(N-tert.-butylaminomethyl)-6-methyl-7-nitro-1,2,3,4-tetrahydroquinoline, 6-hydroxymethyl-2-isopropylaminomethyl-7-nitro-1,2,3,4-tetraquinoline and 6-ethoxymethyl-2-iso-propylaminomethyl-7-nitro-1,2,3,4-tetrahydroquinoline, respectively.

DETAILED DESCRIPTION OF THE INVENTION

The novel compounds of this invention can be prepared in many suitable ways. However, two general methods are most preferred when $R^4$ is methyl, depending on whether n is 1 or 2. Schematically, when n is 1, the following series of reaction steps is involved:

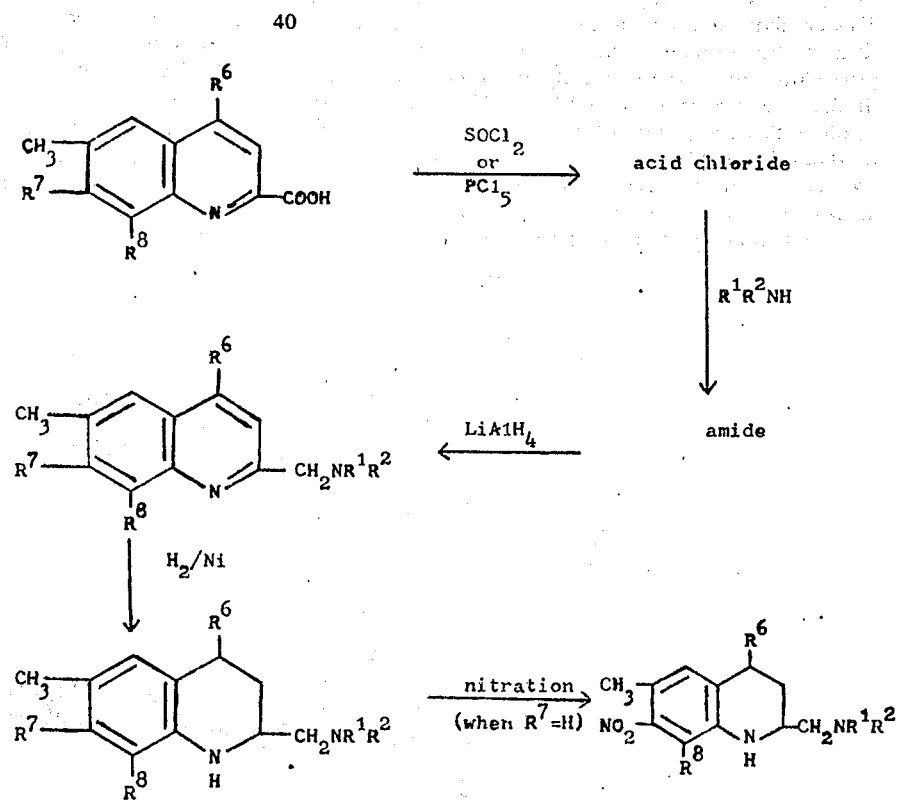

wherein $R^1$, $R^2$, $R^6$ and $R^8$ are each defined as above, and $R^7$ is hydrogen or halogen.

The first step is the well known reaction between an acid chloride and a primary or secondary amine ($R^1R^2NH$). Generally, the acid chloride is prepared in situ by dissolving the carboxylic acid in a solvent such as ether and subsequently adding an excess of thionyl chloride. After allowing the resulting mixture to stand for about one-half hour at room temperature, the solvent is removed under partial vacuum and the solid acid chloride derivative is in condition for the next step which usually takes place immediately. The acid chloride is dissolved in a suitable inert solvent such as toluene and the amine reagent is then added by way of a suitable solution thereof or by bubbling the amine into the liquid if the amine happens to be a gas. In a similar fashion phosphorus penta-chloride may also be used to prepare the acid chloride, followed by treatment as indicated above.

The amide product is obtained by the usual workup procedures. For example, the reaction mixture is washed with water, separated and the organic phase dried over anhydrous sodium sulfate. The organic solvent is then removed yielding the desired product. The next step is a standard lithium aluminum hydride reduction to convert the amide carbonyl function to a methylene group. The reduction is accomplished by dissolving the amide in a solvent such as dioxane and then adding the organic solution slowly to a slurried suspension of lithium aluminum hydride in dried dioxane. Upon completion of the addition step, the mixture is refluxed for approximately 5 hours, cooled and excess lithium aluminum hydride destroyed by cautious addition of water. After filtering to remove solid impurities, the clear solution is distilled in vacuo to near dryness. The residual oil, i.e., intermediate amine product, is then dissolved in methanol and hydrogenated in the presence of Raney nickel in the standard fashion. The catalytic hydrogenation step reduces the hetero ring in the quinoline nucleus and standard workup procedures provide the tetrahydroquinoline product. In the case where $R^7$ is halogen, this is the desired product; however, when $R^7$ is hydrogen, a further nitration step by standard procedures is necessary, for example, by adding the tetrahydroquinoline product dropwise to stirred concentrated sulfuric acid at 0°C. and then treating the resulting chilled solution with a 10% solution of fuming nitric acid dissolved in concentrated sulfuric acid, added dropwise, with cooling below 5°C. The desired 7-nitro product is then recovered by standard workup procedures.

In addition to the above procedure, there are two similarly related methods for preparing the same compounds. The first variation utilizes a 2-formyl-6-methylquinoline starting material instead of the corresponding 2-carboxylic acid. The 2-formyl compound can be simultaneously reacted with the amine reagent ($R^1R^2NH$) and reduced via hydrogenation over Raney nickel, platinum oxide (Adams catalyst) or a 5% palladium-on-barium sulfate catalyst. The combined reaction is generally carried out in a suitable solvent such as absolute alcohol. The product which is obtained is then converted to the 2-aminomethyl tetrahydroquinoline compound by the Raney nickel hydrogenation step discussed above and, if necessary, nitrated as before. Alternatively, the 2-formyl compound can be converted to the 2-iminomethyl compound by reaction with the amine reagent and then reduced to the aminomethyl tetrahydroquinoline by Raney nickel-catalyzed hydrogenation or by sodium borohydride reduction followed by hydrogenation.

The second modification is similar in that it utilizes a 2-chloro or 2-bromomethyl-6-methylquinoline starting material in lieu of the corresponding 2-carboxylic acid. The 2-chloromethyl or 2-bromomethyl reagent is reacted with the appropriate amine ($R^1R^2NH$) in a suitable solvent and the product isolated in accordance with conventional procedure. The amine product thus obtained is then converted to the final desired product by the Raney nickel hydrogenation step followed, if necessary, by nitration as previously described. This latter method may desirably be the method of choice, particularly since it eliminates the side chain reduction step.

Compounds of the invention in which $R^5$ is cyano or halogen may also be prepared from the corresponding compounds in which $R^5$ is nitro by reduction to the amine, followed by diazotization and subsequent conversion to the halo or cyano compound, respectively, via well-known methods.

For the preparation of the compounds of the invention where $n$ is 2, the following sequence of reaction steps, has been found to represent an efficient mode of synthesis:

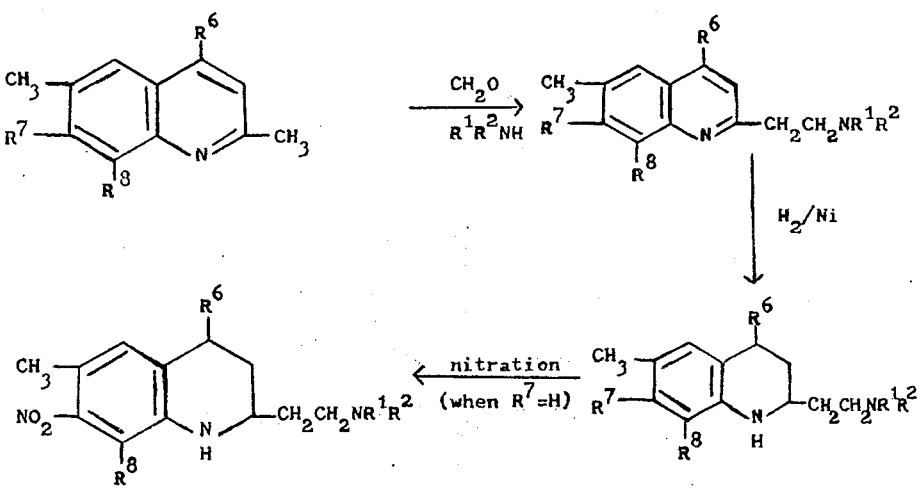

The first step is the reaction between a 2,6-dimethylquinoline compound and formaldehyde in the presence of an appropriate amine ($R^1R^2NH$). This is the well-known Mannich reaction, which is generally carried out in the following manner, viz., the amine in the form of an acid addition salt is dissolved in 40% aqueous formaldehyde solution and then added to an alcoholic solution of the 2,6-dimethylquinoline compound, and the resulting mixture warmed at 50°C for approximately 30 minutes. After extraction, separation and evaporation, etc., the amine product is obtained in a crude form, which is then easily converted to the desired final product by the standard Raney nickel hydrogenation step, followed by nitration if necessary.

It is obvious from the synthetic procedures hereinbefore described that if $R^3$ is to be other than hydrogen, e.g., methyl or ethyl, such a substituent must be placed on the molecule at the end of the proper reaction sequence (but before the final nitration step). For instance, if $R^3$ is methyl, the 2-aminoalkyl tetrahydroquinoline is dissolved in a solvent such as benzene or toluene or a mixture thereof, an excess of a 98% formic acid solution then added and the resulting mixture refluxed for approximately 18 to 20 hours. At the end of this time period, an additional amount of formic acid can be added and refluxing continued for another 24 hours. During the entire reflux period, water is removed as a reaction by-product by means of a Dean-Stark apparatus. The reaction mixture is then cooled, extracted with hydrochloric acid and subsequently basified with a sodium hydroxide solution. Extraction with an organic solvent such as diethyl ether, followed by separation and drying, and then ultimate evaporation under reduced pressure yields the 1-formyl product. This 1-formyl derivative is then converted to the corresponding 1-methyl product by means of the standard lithium aluminum hydride reduction technique.

The 1-ethyl analog is prepared by converting the 2-aminoalkyl tetrahydroquinoline to the corresponding 1-acetyl derivative by reacting said base with acetylchloride in the presence of pyridine. The 1-acetyl derivative is converted to the corresponding 1-ethyl product by the standard lithium aluminium hydride reduction technique referred to above. It may also be prepared by reacting the 2-aminoalkyl tetrahydroquinoline, suitably protected at the amino nitrogen atom, with ethyl bromide, followed by removal of the protecting group.

It should be noted that the starting materials required for all these reactions are either commercially available or else easily prepared using standard organic techniques and procedures. Such techniques are disclosed in standard organic textbooks and/or published specific literature references.

Compounds of the invention in which $R^4$ is hydroxymethyl or formyl may be prepared by fermentative oxidation of those compounds where $R^4$ is methyl, using an appropriate microorganism to effect the microbiological oxidation of the methyl group. The organism described as *Aspergillus sclerotiorum Huber*, publicly available from the Centralbureau voor Schimmelcultures at Baarn, the Netherlands, is found to be particularly suitable for the oxidation conversion process, but the process should not be considered as limited to the use of this specific microorganism since others known to perform such a conversion will also be found equally applicable to the present process.

Compounds of the invention in which $R^4$ is alkoxymethyl, as previously defined, may be prepared from those compounds where $R^4$ is hydroxymethyl by using standard etherification techniques, e.g., by heating a solution of the appropriate 6-hydroxymethyl compound in an alkanol having from 1 to 6 carbon atoms, which also contains a strong acid such as hydrochloric acid or methanesulfonic acid. The product is then recovered as an acid addition salt by means of precipitation and subsequent filtration of said salt, followed by recrystallization from a suitable solvent, or it may simply be converted to the corresponding free base compound by basification in situ and then extraction with a suitable waterimmiscible organic solvent like diethyl ether to afford either the pure base compound as such on subsequent evaporation or the aforesaid acid addition salt after conversion to same by conventional means.

Alternatively, an appropriate 6-hydroxymethyl compound in the form of an acid addition salt with the strong acid may be heated in solution with the aforesaid alkanol under reflux conditions to yield the corresponding acid addition salt of the final product. The latter is then recovered per se or else simply converted to the pure free base compound as before.

Compounds of the invention in which $R^4$ is formyl may also be prepared from those compounds where $R^4$ is hydroxymethyl by oxidation of the hydroxymethyl compound dissolved in a suitable solvent, such as benzene, with an oxidizing agent such as manganese dioxide.

Also contemplated as being within the scope of the invention are the pharmaceutically-acceptable acid addition salts and N-oxide derivatives of the novel base compounds hereinbefore described. The acids which are used to prepare the pharmaceutically-acceptable acid addition salts are those which form non-toxic addition salts containing pharmaceutically-acceptable anions, such as the hydrochloride, hydrobromide, hydroiodode, sulfate or bisulfate, phosphate or acid phosphate, acetate, lactate, citrate, tartrate, gluconate, saccharate, maleate, fumarate, pamoate (embonate) and p-toluenesulfonate salts. The conversion of compounds of this invention to their acid addition salts is suitably carried out in the following manner, viz., to an alcoholic solution of the 2-aminoalkyl tetrahydroquinoline free base compound is added a stoichiometric equivalent amount of a suitable acid. The resulting solution is then stripped free of solvent and the residue, i.e., desired acid addition salt, is subsequently recrystallized, filtered and dried. Since two sites for possible salt formation exist in the molecule, it is possible to prepare both mono and di-salts, and the ultimate product will depend upon the amount of free acid added. However, various factors may preclude the formation of the di-salt in certain instances.

Conversion of compounds of this invention to their N-oxides, when neither $R^1$ nor $R^2$ is hydrogen, is suitably carried out by treatment with 30% hydrogen peroxide in a suitable solvent, e.g., dry acetone.

The compounds of the invention exist in D- and L-optically-active isomeric forms, in virtue of the asymmetric carbon atom situated in the 2-position of the tetrahydroquinoline nucleus, and the invention includes these separated isomeric forms as well as racemic DL-mixtures thereof produced by the above described synthetic methods as well within its scope.

As previously indicated, the compounds of this invention have been shown to be effective therapeutically as schistosomicides. Schistosomiasis is a parasitic disease resulting in local and visceral manifestations due to infection with blood flukes of the genus Schistosoma. Man becomes infected by bathing, wading, washing or on other contact with the free-swimming cercariae forms of the parasite which penetrate the skin. An area in which the disease has been found to be particularly prevalent is in the northern two-thirds of the South American continent. There are three species which cause the disease in higher animals, including man, viz., S. haematobium, S. japonicum and S. mansoni. However, the compounds of this invention are surprisingly, remarkably effective against Schistosoma mansoni in experimental test animals when administered at even low dosages, e.g., mice or monkeys are effectively treated after oral or parenteral administration at dosages ranging from 25 to 200 mg./kg. in a single dose or up to seven daily doses. For human treatment, administration may be by way of parenteral route, e.g., intramuscularly or intravenously, but is preferably done by way of the oral route. Dosages may be in the range from 5.0 to 150 mg./kg. and preferably in the range from 10 to 50 mg./kg. daily for a period of up to seven days, or in the range from 50 to 120 mg./kg. in a single daily oral dose.

The compounds of the invention can be administered alone, but will generally be administered in conjunction with a pharmaceutical carrier that is selected with regard to the intended route of administration and standard pharmaceutical practice. For example, they may be administered orally in the form of tablets containing such excipients as starch or lactose, or in capsules either alone or on admixture with excipients, or else in the form of elixirs or suspensions containing flavoring or coloring agents, etc. For purposes of parenteral administration, they are best used in the form of a sterile aqueous solution of a water-soluble salt, which solution may also contain sufficient saline or glucose to render the final composition isotonic. Many of the pharmaceutically-acceptable salts of the compounds of this invention are insoluble in water, but methanesulfonate salts have been found to be highly water-soluble. Moreover, the 6-alkoxymethyl ethers of this invention are highly acid stable and therefore, afford certain advantages when formulating dosage forms.

The activity of the compounds of the present invention as schistosomicides, is assessed by a technique which depends on the movement of adult schistosomes from their normal sites in the mesenteric veins to the veins within the liver, as effected by chemotherapeutically-active compounds. This technique has been described in detail by O. D. Standen in "Experimental Chemotherapy" (editors R. J. Schnitzer and F. Hawking), Volume I, pp. 752–3. In the present case, white mice of 3–4 weeks age were infected percutaneously with 120–150 cercariae of Schistosoma mansoni (East African strain). Eight to ten weeks after infection, the compound to be assessed was administered orally or intra-peritoneally at a basic dosage of 25 mg./kg. daily for a period of four days, or at 50 mg./kg. in a single dose. Efficacy was then assessed 24 hours after the last dose of multiple dosage, or 72 hours after a single dose. Mice was perfused post mortem to recover worms separately from the mesenteric veins, as well as from the hepatic portal vein and from the veins within the liver. The proportional movement of worms from the portal and mesenteric veins to the veins within the liver formed the basis for the assessment.

Compounds showing promising activity in mice were also assessed in Cebus or Vervet monkeys which had been infected percutaneously with 500 cerceriae of the same strain of Schistosoma mansoni about three months previously and in which the faecal egg output had stabilized. The compound to be assessed was administered orally, intramuscularly or intravenously and the effect (i.e., reduction) on total daily faecal egg output was observed. Rectal biopsies were examined for the presence of eggs at different stages of development, as well as for dead eggs. Finally, in cases of apparent cure, perfusion was carried out post mortem to recover worms, if any, from the blood vessels.

The following examples are provided by way of illustration only and should not be interpreted as limiting the invention, many variations of which are possible without departing from the spirit or scope thereof.

EXAMPLE I 2-(N,N-Diethylaminomethyl)-6-methyl-7-nitro-1,2,3,4-tetrahydroquinoline 1. 200 G. of 6-methylquinoline-2-carboxylic acid is suspended in 5 liters of dry toluene and treated with phosphorus pentachloride (1 mole per mole of acid) and refluxed for 2 hours. After decolorizing with charcoal and filtering, the solution of the acid chloride so formed is cooled to room temperature in the absence of moisture and then added to a solution of diethylamine (2 moles per mole of original acid) in dry toluene (3 volumes per volume of diethylamine). The bright red product is stirred for one-half hour and then washed with water and dried over anhydrous sodium sulfate. After distilling off the toluene in vacuo, the solid residue is crystallized from ethanol to yield 2-(N,N-diethylcarbamoyl)-6-methylquinoline (m.p. 117°–119°C.; overall yield, 65–75%).

2. A solution of 35 g. of the product of (1) in 350 ml. of dry dioxane is added slowly to a stirred suspension of lithium aluminum hydride [1.5 moles per mole of product of (1)] in dry dioxane (25 ml. per g. of LiAlH$_4$). The mixture is stirred at reflux temperature for 5 hours and then cooled in an ice bath. Water is added cautiously to destroy excess LiAlH$_4$. After filtration, the solution is distilled in vacuo to dryness. The residual oil (30 g.) is dissolved in 450 ml. of methanol and hydrogenated in an autoclave at 75°C. and 750 p.s.i. in the presence of Raney nickel for 4 hours. The product is cooled to room temperature, filtered and distilled in vacuo to yield 2-(N,N-diethylaminomethyl)-6-methyl-1,2,3,4-tetrahydroquinoline [b.p. 120°–130°C. at 0.2 mm. Hg; overall yield of stage (2), 35–50%].

3. 20 G. of the product of (2) is added dropwise to 500 ml. of concentrated sulfuric acid cooled in ice and stirred during the addition. The mixture is then warmed gently to 20°C. to form a clear solution, cooled again in ice to below 5°C. and treated with a 10% solution of fuming nitric acid [sp. gr. 1.5; 1 mole per mole of product of (2)] in concentrated sulfuric acid, added dropwise with stirring to keep the temperature below 5°C. After stirring in an ice bath for a further three hours, the solution is poured onto ice and neutralized with sodium bicarbonate. The product separated as a red oil, together with sodium sulfate, and is collected by filtering and washing with diethyl ether. The filtrate is next extracted with ether, and the combined ether extracts and washings are dried to yield 2-(N,N-diethylaminomethyl)-6-methyl-7-nitro-1,2,3,4-tetrahydroquinoline as a red oil, which is crystallized from 60/80°C. petroleum ether at −80°C. in a bath of chloroform and solid carbon dioxide. After drying, the product melted at 52°–54°C. (yield 50%).

Anal. Calcd. for $C_{15}H_{23}N_3O_2$: C, 64.86; H, 8.33; N, 14.95.

Found: C, 64.86; H, 8.33; N, 14.95

EXAMPLE II

The dihydrochloride of the product of Example I is prepared by dissolving the free base in dry diethyl ether and treating the resulting solution with dry ethereal hydrogen chloride solution. The precipitated salt is then recrystallized from ethanol-ether solution. It has the following characteristics:

M.p. 160°–167°C.

Anal. Calcd. for $C_{15}H_{23}N_3O_2 \cdot 2HCl$: C, 51.4; H, 7.2; N, 12.0. Found: C, 51.54; H, 6.98; N, 11.72.

EXAMPLE III

The p-toluenesulfonate of the product of Example I is prepared by dissolving the free base in dry ethyl acetate and treating the solution with an excess of p-toluenesulfonic acid dissolved in dry ethyl acetate. The precipitated salt is recrystallized from ethyl acetate containing 10% of ethanol. It had the following characteristics:

M.p. 156°–158°C.

Anal. Calcd. for $C_{15}H_{23}N_3O_2 \cdot C_7H_8O_3S$: C, 58.75; H, 6.95; N, 9.35.

Found: C, 58.58; H, 6.96; N, 8.87.

EXAMPLE IV

2-Aminomethyl-6-methyl-7-nitro-1,2,3,4-tetrahydroquinoline 1. 1-Benzoyl-2-cyano-6-methyl-1,2-dihydroquinoline (200 g.) [prepared by the method of Reissert from 6-methylquinoline, benzoyl chloride and potassium cyanide] is dissolved in ethyl acetate (1000 ml.) and hydrogenated in an autoclave at 90°C. and 1,500 p.s.i. in the presence of Raney nickel for 4 hours. The solution is cooled to room temperature, filtered and the solvent distilled in vacuo to yield 2-(N-benzoylaminomethyl)-6-methyl-1,2,3,4-tetrahydroquinoline, which crystallized under ether and is recrystallized from ethanol (m.p. 130°–132°C., yield 40–50%).

2. The product of (1) is suspended in a mixture of 90% by volume of 5N hydrochloric acid and 10% by volume of ethanol, refluxed overnight (18 hours) and allowed to cool. After it had been made strongly alkaline with 5N sodium hydroxide, the solution is extracted with ether and filtered. The ether layer is separated from the filtrate, and the aqueous layer is further extracted with ether. The insoluble material on the filter is then dissolved in 2N hydrochloric acid, treated again with alkali and extracted with ether. The combined ether extracts are dried over anhydrous sodium sulfate and distilled to yield an oil of b.p. 126°–140°C. at 0.4 mm. Hg [yield of stage (2) 50%].

3. The product of stage (2) is nitrated as described in stage (3) of Example I to yield 2-aminomethyl-6-methyl-7-nitro-1,2,3,4-tetrahydroquinoline as an orange-red solid, which is crystallized from methanol to give 1.1 g. of product having the following characteristics:

M.p. 133°–135°C.

Anal. Calcd. for $C_{11}H_{15}N_3O_2$: C, 59.73; H, 6.79; N, 19.0.

Found: C, 59.24; H, 6.64; N, 18.52.

EXAMPLE V

The following compounds reported in the table (where theoretical analytical value are expressed in parentheses) are prepared by the method described in Example I, using as starting materials 6-methylquinoline-2-carboxylic acid and the appropriate primary or secondary amine of formula $R^1R^2NH$:

| $R^1$ | $R^2$ | Aminequineline, b.p. | Product, salt m.p. | C | H | N |
|---|---|---|---|---|---|---|
| $CH_3$ | H | 104–8°C./0.09 mm. Hg | HCl 200–2°C. $C_{12}H_{18}ClN_3O_2$ | 53.16 (53.04) | 6.68 (6.68) | 15.66 (15.46) |
| $C_2H_5$ | H | 140–2°C./0.5 mm. Hg | HCl 244–8°C.(d) $C_{13}H_{20}ClN_3O_2$ | 53.17 (54.62) | 7.23 (7.05) | 14.29 (14.36) |
| n—$C_3H_7$ | H | 138–42°C./0.4 mm. Hg | HCl 232–5°C. $C_{14}H_{20}ClN_3O_2$ | 56.70 (56.05) | 7.07 (7.04) | 13.24 (14.02) |
| n—$C_4H_9$ | H | 146–51°C./0.2 mm. Hg | HCl 199–203°C. $C_{15}H_{24}ClN_3O_2$ | 57.33 (75.44) | 7.69 (7.71) | 12.90 (13.39) |
| $CH_3$ | $CH_3$ | — | HCl 246–8°C. $C_{13}H_{20}ClN_3O_2$ | 54.69 (54.62) | 7.30 (7.06) | 14.55 (14.36) |
| n—$C_3H_7$ | n—$C_3H_7$ | 135°C./1.0 mm. Hg | 2HCl — $C_{17}H_{29}Cl_2N_3O_2$ | 54.10 (53.98) | 8.04 (7.73) | 10.38 (11.11) |
| (-N)⟩ (piperidino) | | 136–145°C./0.5–1mm. Hg | — 102–4°C. $C_{16}H_{23}N_3O_2$ | 66.41 (66.41) | 8.12 (8.01) | 14.79 (14.52) |
| (-N)⟩O (morpholino) | | 104°C.(m.p.) | — 134–5°C. $C_{15}H_{21}N_3O_3$ | 62.17 (61.84) | 7.04 (7.27) | 14.30 (14.42) |
| (-N)⟩ (pyrrolidino) | | 134–8°C./0.08 mm. Hg | — 97–8°C. $C_{15}H_{21}N_3O_2$ | 65.29 (65.43) | 7.58 (7.69) | 15.35 (15.26) |
| (-N)⟩NH (piperazino) | | — | — | — | — | — |
| (-N)⟩S (thiomorpholino) | | — | — | — | — | — |

| R¹ | R² | Aminequine-line, b.p. | Product, salt m.p. | C | H | N |
|---|---|---|---|---|---|---|
| (-N)⟩N—CH₃ | | — | — | — | — | — |
| (-N)⟩N—C₆H₁₃(n) | | — | — | — | — | — |
| (-N)⟩N—CH₂CH₂OH | | — | — | — | — | — |

EXAMPLE VI

2-Isopropylaminomethyl-6-methyl-7-nitro-1,2,3,4-tetrahydroquinoline 1. 2,6-Dimethylquinoline (314 g., 2 moles) is dissolved in 1 liter of carbon tetrachloride and sodium carbonate (200 g.) is added to the solution, which is then stirred and warmed to 60°C. Heat is removed and chlorine is passed into the solution at 300–400 ml/min., the temperature being controlled at about 60°C. After 5 ½ hours, reaction is complete and the product starts crystallizing out of solution. The reaction products are then cooled and poured into 1 liter of 2N hydrochloric acid. The organic layer is separated and extracted three times with 1 liter of 2N hydrochloric acid. The combined acid layers are washed with methylene dichloride (500 ml.) and then basified with sodium carbonate, at which point 2-chloromethyl-6-methylquinoline separated as a pale buff solid. Filtration and drying yielded 348 g. of product, m.p. 108°–110°C.

2. 250 G. of the product of (1) is added over one-half hour to a stirred solution of isopropylamine (1.25 liter) in methylated spirit (1.25 liter) and stirred for a further hour. After standing for 18 hours, the solution is treated with charcoal and filtered. Evaporation to a thick slurry is followed by partitioning between 1 liter each of water and methylene dichloride. The aqueous layer is separated and extracted twice with 500 ml. of methylene dichloride. The combined organic layers are dried and evaporated to yield 2-isopropylaminomethyl-6-methylquinoline as a dark oil (249 g.).

3. 235 G. of the product of (2) are dissolved in 1.4 liter of methylated spirit and hydrogenated in the presence of Raney nickel at 750 p.s.i. and 75°C. (complete after 2 ½ hours). After filtration and cooling to 0°C., 120 g. of concentrated sulfuric acid are added dropwise over one-half hour, with further solvent being added as necessary. The precipitate is then filtered, washed with acetone and ether, and dried to yield 300 g. of 2-isopropylaminomethyl- 6-methyl-1,2,3,4-tetrahydroquinoline hydrogen sulfate as a white amorphous solid (m.p. 145–158°C.).

4. 253 G. of the product of (3) is nitrated as described in Example I (3), except that neutralization is carried out with 10N sodium hydroxide solution. The orange oily product is extracted into methylene dichloride, evaporated and re-dissolved in ethyl acetate, dried and evaporated again, and then converted to the maleate salt by conventional means. Crystallization from methylated spirit yielded 144 g. of 2-isopropylaminomethyl-6-methyl-7-nitro-1,2,3,4-tetrahydroquinoline hydrogen maleate as dark brown needles (m.p. 183°–4°C.).

Anal. Calcd. for $C_{14}H_{21}N_3O_2 \cdot C_4H_4O_4$: C, 57.01; H, 6.60; N, 11.08.

Found: C, 57.06; H, 6.50; N, 11.14.

EXAMPLE VII

The tartrate and hydrochloride salts of the product of Example VI are prepared by treating the free base with an excess of tartaric acid (dissolved in ethyl acetate) and 5N hydrochloric acid, respectively. The hemi-tartrate melted at 229°–230°C.

Anal. Calcd. for $C_{14}H_{21}N_3O_2 \cdot 0.5\ C_4H_6O_6$: C, 56.80; H, 7.10; N, 12.42.

Found: C, 56.61; H, 6.79; N, 12.22.

The hydrochloride melted at 268°C.

Anal. Calcd. for $C_{14}H_{21}N_3O_2 \cdot HCl$: C, 56.08; H, 7.35; N, 14.02.

Found: C, 55.65; H, 7.42; N, 13.72.

EXAMPLE VIII

2-(N-tert.-Butylaminomethyl)-6-methyl-7-nitro-1,2,3,4-tetrahydroquinoline

1. A mixture of 2-formyl-6-methylquinoline (10.25 g., 0.06 mole) and tertiary-butylamine (17.52 g., 0.24 mole) in absolute alcohol (200 ml.) is hydrogenated over 5% palladium on barium sulfate catalyst (10 g.) at 50 p.s.i. for 1 hour. The catalyst is removed by filtration and evaporation of the solvent yielded a brown mobile oil, which is distilled to give 2-(N-tert-butylaminomethyl-6-methylquinoline as a golden-yellow mobile oil of b.p. 142°C./0.7 mm. Hg (yield 11.7 g.).

2. 10 G. of the product of (1) in ethanol (175 ml.) is hydrogenated over Raney nickel (2 g.) at 75°C. and 750 p.s.i. for four hours. The catalyst is removed by filtration and the alcohol evaporated in vacuo to yield an oil which is fractionally distilled to give 2-(N-tertiary-butylaminomethyl)-6-methyl-1,2,3,4-tetrahydroquinoline of b.p. 125°–130°C./0.6 mm. Hg (yield 8.6 g.).

3. 5.34 G. of the product of (2) is nitrated as in Example I (3). The dark red oily product is extracted into chloroform, dried and evaporated in vacuo, and then chromatographed on a column of neutral alumina. Elution with a 50% mixture of benzene and chloroform removes an orange band and evaporation of the solvent gives 2-(N-tert-butylaminomethyl)-6-methyl-7-nitro- 1,2,3,4-tetrahydroquinoline as a bright red solid of m.p. 63°–68°C.

Anal. Calcd. for $C_{15}H_{23}N_3O_2$: C, 65.00; H, 8.30; N, 15.16.

Found: C, 64.60; H, 8.10; N, 15.35.

EXAMPLE IX

The following compounds reported in the table (where theoretical analytical values are expressed in parentheses) are prepared by the method described in Example VIII, using as starting materials 2-formyl-6-methylquinoline and the appropriate primary amine $R^1NH_2$:

| $R^1$ | $R^2$ | Aminoquinoline, b.p. | Product, salt m.p. | C | Analysis, % H | N |
|---|---|---|---|---|---|---|
| iso-$C_4H_9$ | H | 180°C./3 mm. Hg | HCl 244–6°C. $C_{15}H_{24}ClN_3O_2$ | 57.22 (57.44) | 7.80 (7.71) | 13.15 (13.39) |
| sec-$C_4H_9$ | H | 138–9°C./0.8 mm. Hg | HCl 226°C. $C_{15}H_{24}ClN_3O_2$ | 57.50 (57.44) | 7.48 (7.71) | 13.05 (13.39) |
| neo-$C_5H_{11}$ | H | 123–6°C./0.25 mm. Hg | 1.5 HCl 192–4°C. $C_{16}H_{26.5}Cl_{1.5}N_3O_2$ | 55.90 (55.52) | 7.88 (7.72) | 12.08 (12.14) |
| cyclo-propyl | H | 115–120°C./0.2 mm.Hg | maleate 172–3°C. $C_{18}H_{23}N_3O_6$ | 56.72 (57.28) | 6.53 (6.14) | 10.77 (11.14) |
| cyclo-hexyl | H | 154–8°C./0.4 mm. Hg | — 84–6°C. $C_{17}H_{25}N_3O_2$ | 67.31 (67.30) | 8.47 (8.31) | (14.18) (13.85) |

EXAMPLE X

1-Ethyl-2-ethylaminomethyl-6-methyl-7-nitro-1,2,3,4-tetrahydroquinoline 1. 2-Aminomethyl-6-methyl-1,2,3,4-tetrahydroquinoline (4.4 g.) is dissolved in 10 ml. of dry pyridine and the solution stirred in an ice-water bath, while 5 g. of acetyl chloride is cautiously added dropwise (violent reaction). The mixture is heated for 20 minutes on a steam bath and then poured, with stirring, into 200 ml. of ice-cold water. The resulting solution is neutralized with sodium carbonate and extracted with two-100 ml. portions of chloroform. The combined extracts are washed twice with water, dried over magnesium sulfate and evaporated. The residual oil is triturated with dry ether and the solid thus produced is recrystallized by dissolution in 10 ml. of benzene, followed by the addition of 60°/80°C. petroleum ether to the point of turbidity. Cooling the solution to 0°C., gives 3.8 g. of 1-acetyl-2-acetamidomethyl-6-methyl-1,2,3,4-tetrahydroquinoline as a cream-colored powder of m.p. 125°–126°C.

2. 3.0 G. of the product of (1) is dissolved in 50 ml. of dry dioxane and the solution added over a period of 20 minutes to a stirred suspension of 5 g. of lithium aluminum hydride in 50 ml. of dry dioxane. The mixture is stirred and refluxed for 3 ½ hours and the excess lithium aluminum hydride cautiously decomposed with water. 200 ml. of a saturated solution of Rochelle salt in water and 200 ml. of ether are added, and the mixture filtered through a bed of kiesulguhr. The organic layer is separated and the aqueous layer further extracted with two-100 ml. portions of ether. The combined organic portions are dried over magnesium sulfate and evaporated. The residual oil is fractionally distilled under reduced pressure, the fraction distilling at 132°–134°C. at 0.35 mm. Hg pressure being collected to yield 1.1 g. of 1-ethyl-2-ethylaminomethyl-6-methyl-1,2,3,4-tetrahydroquinoline.

3. 2.32 G. of the product of (2) is nitrated as in Example I (3). The product is extracted into chloroform, dried over magnesium sulfate and evaporated to leave a red gum. This is extracted with portions of boiling 60°/80°C. petroleum ether until the portions are no longer colored. The black, oily residue is discarded and the petrol extracts combined and evaporated to give a reddish gum. This is dissolved in 10 ml. of hot methanol and on cooling, a very small quantity of a waxy red solid separated and is subsequently discarded. The solution is then treated with 2 g. of p-toluenesulfonic acid dissolved in 50 ml. of ether. A yellow precipitate formed on standing. It is filtered off and recrystallized from a minimum of boiling ethanol to give 0.65 g. of 1-ethyl-2-ethylaminomethyl-6-methyl-7-nitro-1,2,3,4-tetrahydroquinoline p-toluenesulfonate as a bright yellow powder, m.p. 172°–174°C.

Anal. Calcd. for $C_{15}H_{23}N_2O_2 \cdot C_7H_8O_3S$: C, 58.78; H, 6.95; N, 9.35.

Found: C, 58.87; H, 6.99; N, 9.10.

EXAMPLE XI

2-Diethylaminomethyl-1,6-dimethyl-7-nitro-1,2,3,4-tetrahydroquinoline 1. 2-Diethylaminomethyl-6-methyl-1,2,3,4-tetrahydroquinoline (6 g.) is dissolved in a mixture of 50 ml. of benzene and 50 ml. of toluene, 4 ml. of 98% formic acid added and the mixture refluxed for 18 hours, with the water formed being collected in a Dean-Stark apparatus. An additional 4 ml. of formic acid is added and the mixture refluxed for a further 24 hours. A total of 6.7 ml. of water was collected in the Dean-Stark trap. The mixture is cooled, then extracted with two-50 ml. portions of 2N hydrochloric acid and the combined extracts basified with 5N sodium hydroxide solution. This mixture is then extracted with two-100 ml. portions of ether, and the combined extracts dried over magnesium sulfate and evaporated to leave 5.6 g. of a colorless oil. This is distilled at reduced pressure, the fraction distilling at 133°–134°C./0.40–0.45 mm. Hg being collected to yield 4.82 g. of 2-diethylaminomethyl-1-formyl-6-methyl-1,2,3,4-tetrahydroquinoline.

2. 4.2 G. of the product of (1) in 70 ml. dry dioxane is added over a period of 20 minutes to a stirred suspension of 3 g. of lithium aluminum hydride in 100 ml. of dry dioxane. The mixture is stirred and refluxed for 6 hours, and the excess lithium aluminum hydride cautiously decomposed with 50% aqueous dioxane. The mixture is filtered, the residue washed with dioxane and the filtrate evaporated to dryness. The residue is distilled at reduced pressure, the fraction distilling at 116°–118°C./0.45–0.50 mm. Hg being collected to yield 2.84 g. of 2-diethylaminomethyl-1,6-dimethyl-1,2,3,4-tetrahydroquinoline.

3. 2.6 G. of the product of (2) is nitrated as in Example I (3) to yield an orange-red oil. This oil is dissolved in dry ether and the solution treated with dry hydrogen chloride. The yellow precipitate is recrystallized twice from iso-propanol/ether to give 2-diethylaminomethyl-1,6-dimethyl-7-nitro-1,2,3,4-tetrahydroquinoline monohydrochloride, as a bright yellow powder of m.p. 200–202°C.

Anal. Calcd. for $C_{16}H_{25}N_3O_2$ HCl: C, 58.99; H, 7.81; N, 12.81.
Found: C, 58.67; H, 8.04; N, 12.75.

EXAMPLE XII 2-(β-Diethylaminoethyl)-6-methyl-7-nitro-1,2,3,4-tetrahydroquinoline 1. Diethylamine hydrochloride (5.9 g.) dissolved in 10 ml. of 40% aqueous formaldehyde solution is added dropwise to 15.7 g. of 2,6-dimethylquinoline in 10 ml. of ethanol and the mixture warmed at 50°C. for 50 minutes, at the end of which time it becomes homogeneous. The mixture is cooled and diluted with water, which precipitated unchanged 2,6-dimethylquinoline. This is removed by extraction with two-50 ml. portions of ether and the aqueous layer basified with 5N sodium hydroxide solution. This solution is then extracted with two-50 ml. portions of ether, the combined extracts dried over magnesium sulfate and evaporated to leave a yellow oil. This is distilled under reduced pressure, the main fraction being collected at 184–190°C./6 mm. Hg. The 4.3 g. of oil collected in this range is re-fractionated to yield 4.0 g. of 2-(β-diethylaminoethyl)-6-methylquinoline, b.p. 119°–120°C./0.09–0.10 mm. Hg.

2. 6.9 G. of the product of (1) dissolved in 100 ml. of absolute ethanol is hydrogenated at 750 p.s.i. at 75°C. with 2 g. of Raney nickel as catalyst. The mixture is filtered through a bed of kieselguhr, the filtrate evaporated and the residual oil fractionated at reduced pressure. The main fraction is distilled at 120°–122°C./0.20 mm Hg to yield 4.7 g. of 2-(β-diethylaminoethyl)-6-methyl-1,2,3,4-tetrahydroquinoline.

3. 4 G. of the product of (2) is nitrated as in Example I (3). The product is extracted into ether, and 1.5 g. of this extract is chromatographed on a column of neutral alumina. Two minor components are eluted with 20% benzene in petrol, and the bulk of the material is eluted with chloroform and evaporated to yield 1.0 g. of 2-(β-diethylaminoethyl)-6-methyl-7-nitro-1,2,3,4-tetrahydroquinoline, which is converted into the dihydrochloride salt by treating an ethanolic solution with dry hydrogen chloride and then adding dry ether to precipitate the salt, m.p. 150°–155°C.

Anal. Calcd. for $C_{16}H_{25}N_3O_2.2HCl$: C, 52,74; H, 7.47; N, 11.53.
Found: C, 52.84; H, 7.32; N, 11.21.

EXAMPLE XIII

2-Diethylaminomethyl-1-ethyl-6-methyl-7-nitro-1,2,3,4-tetrahydroquinoline 1. 2-Diethylaminomethyl-6-methyl-1,2,3,4-tetrahydroquinoline (10 g.) prepared as in Example I (2) is dissolved in 10 ml. of dry pyridine and the solution cooled to 0°C. in an ice-bath. With vigorous stirring, 5 g. of acetyl chloride is added over a period of 10 minutes, and the mixture is then warmed on a steam bath for a further 20 minutes. The solution is poured into 100 ml. of ice-water, basified with sodium carbonate and extracted with two-100 ml. portions of ether. The etheral extracts are combined, washed several times with water, dried over magnesium sulfate and evaporated to yield 12.3 g. of a brown oil. This is fractionated at reduced pressure to give 5.63 g. of 1-acetyl-2-diethylaminomethyl-6-methyl-1,2,3,4-tetrahydroquinoline, a pale yellow oil, b.p. 160°–162°C./0.70 mm. Hg.

2. 5.0 G. of the product of (1) are reduced with lithium aluminum hydride as in Example XI to yield an orange oil, which is then fractionated at reduced pressure. The product is collected by distillation at 145°–148°C./0.10 mm. Hg to yield 2.90 g. of 2-diethylaminomethyl-1-ethyl-6-methyl-1,2,3,4-tetrahydroquinoline.

3. The product of (2) is nitrated as in Example I (3). The resulting product is extracted into ether, dried over magnesium sulfate and evaporated to leave 2.80 g. of a viscous red oil. This is taken up in ethanol, the resulting solution treated with dry hydrogen chloride and dry ether then added to precipitate the sesqui-hydrochloride of 2-diethylaminomethyl-1-ethyl-6-methyl-7-nitro-1,2,3,4-tetrahydroquinoline as a bright yellow powder of m.p. 180°–5°C.

Anal. Calcd. for $C_{17}H_{27}N_3O_2.1.5$ HCl: C, 56.70; H, 7.56; N, 11.67.
Found: C, 56.35; H, 7.44; N, 11.60.

EXAMPLE XIV

7-Chloro-2-diethylaminomethyl-6-methyl-1,2,3,4-tetrahydroquinoline

1. A solution of 10 g. of 2-bromomethyl-7-chloro-6-methylquinoline in a mixture of 100 ml. ethanol and 200 ml. chloroform at room temperature is added over a period of 5 minutes to a solution of 8.1 g. of diethylamine in 100 ml. ethanol with stirring. The solution is then allowed to stand at room temperature for 15 hours and the solvents are distilled off under vacuum. The oily residue is triturated with about 100 ml. of water, the product extracted into chloroform and traces of excess diethylamine removed by washing the chloroform solution three times with water. The chloroform solution is then dried over magnesium sulfate and distilled in vacuo to dryness. The residual oil is dissolved in about 200 ml. of dry ether and dry hydrogen chloride gas is bubbled through the solution to precipitate 7-chloro-2-diethylaminomethyl-6-methylquinoline hydrochloride. The salt crystallized on standing and is subsequently collected and recrystallized from ethanol, with a little diethyl ether added to ensure a good recovery of product. This gave 6.6 g. of white crystalline material of m.p. 196°–202°C.

2. The product of (1) is hydrogenated in the presence of Raney nickel as described in Example IX. The green residue after evaporation of the ethanol is triturated with an ethyl acetate/ligroin mixture until a solid crystalline product is obtained. This product is then recrystallized from iso-propanol/ether to give 7-chloro-2-diethylaminoethyl-6-methyl-1,2,3,4-tetrahydroquinoline hydrochloride as a white crystalline product of m.p. 172°–3°C.

Anal. Calcd. for $C_{15}H_{23}ClN_2.HCl$: C, 59.4; H, 8.0; N, 9.25.
Found: C, 58.97; H, 7.99; N, 9.00.

EXAMPLE XV

The following compounds reported in the table (where theoretical analytical values are given in parentheses) are prepared by the method described in Example IX, using as starting materials 7-chloro-2-formyl-6-methylquinoline and the appropriate primary amine $R^1NH_2$:

| R¹ | R² | Product salt | m.p. | Analysis % C | H | N |
|---|---|---|---|---|---|---|
| iso-C₃H₇ | H | 2HCl C₁₄H₂₃N₂Cl₃ | 252–5°C. | 58.7 (58.1) | 7.7 (7.7) | 9.4 (9.7) |
| n-C₄H₉ | H | HCl C₁₅H₂₄N₂Cl₂ | 233–4°C. | 59.52 (59.40) | 7.72 (7.98) | 9.21 (9.24) |

EXAMPLE XVI

2-Diethylaminomethyl-4,6-dimethyl-7-nitro-1,2,3,4-tetrahydroquinoline 1. 2,4,6-Trimethylquinoline (40 g., 0.234 mole) is chlorinated in a manner analogous to that described in Example VI (1) to give 2-chloromethyl-4,6-dimethylquinoline as a buff colored powder. Recrystallization from 40°/60°C. petroleum ether gives 23 g. of very pale yellow needles, m.p. 60°–61°C.

2. 15 G. of the product of (1) suspended in absolute ethanol (100 ml.) is treated with diethylamine (20 ml., 14.2 g.) and complete dissolution is brought about by warming. The mixture is then left to stand overnight and the ethanol distilled off under reduced pressure. The semi-solid residue is treated with excess 2N sodium hydroxide solution and extracted with two-200 ml. portions of ether. The combined extracts are dried over magnesium sulfate, the ether evaporated off and the residual oil fractionated under reduced pressure. 2-Diethylaminomethyl-4,6-dimethylquinoline distilled at 119°C./0.18 mm. Hg. as a very pale yellow oil.

3. 15 G. of the product of (2) is hydrogenated as described in Example VIII (2), fractional distillation yielding 3.7 g. of 2,4,6-trimethyl-1,2,3,4-tetrahydroquinoline (b.p. 90°–110°C./1.0–1.5 mm. Hg) and 2.0 g. of 2-diethylaminomethyl-4,6-dimethyl-1,2,3,4-tetrahydroquinoline as a pale yellow oil (b.p. 112°C./0.20 mm. Hg.).

4. 1.5 G. of the latter product of (3) is nitrated and converted to the maleate salt as in Example VI (4) and recrystallized from ethyl acetate, containing a trace of methanol, to yield 0.65 g. of 2-diethylaminomethyl-4,6-dimethyl-7-nitro-1,2,3,4-tetrahydroquinoline hydrogen maleate as red needles, m.p. 131°–2°C.

Anal. Calcd. for $C_{18}H_{25}N_2O_6 \cdot C_4H_4O_4$: C, 58.95; H, 7.17; N, 10.31.

Found: C, 58.80; H, 7.08; N, 10.17.

Example XVII 2-n-Butylaminomethyl-4,6-dimethyl-7-nitro-1,2,3,4-tetrahydroquinoline Using 2-chloromethyl-4,6-dimethylquinoline and n-butylamine as starting materials, 2-n-butylaminomethyl-4,6-dimethyl-1,2,3,4-tetrahydroquinoline is prepared as in Example XVI (2) and (3) as a solid, m.p. 70°C. This product is then nitrated and converted to the maleate salt as in Example VI (4) to yield 2-n-butylaminomethyl-4,6-dimethyl-7-nitro-1,2,3,4-tetrahydroquinoline, m.p. 196°–7°C.

Anal. Calcd. for $C_{20}H_{29}N_3O_6$: C, 58.97; H, 7.13; N, 10.32.

Found: C, 58.86; H, 7.04; N, 10.55.

EXAMPLE XVIII 2-(N-Methyl-N-isopropylaminomethyl)-6-methyl-7-nitro-1,2,3,4-tetrahydroquinoline Using 2-chloromethyl-6-methylquinoline and N-methyl-isopropylamine as starting materials (refluxed for 8 hours in absolute alcohol), 2-(N-methylisopropylaminomethyl)-6-methyl-1,2,3,4-tetrahydroquinoline is prepared as in Example XVI (2) and (3) as a liquid, b.p. 128°–9°C./0.3 mm. Hg. This product is then nitrated as in Example I (3) and converted to the hydrochloride salt by conventional means. Crystallization from ethyl acetate then gave 2-(N-methylisopropylaminomethyl)-6-methyl-7-nitro-1,2,3,4-tetrahydroquinoline hydrochloride as an orange solid, m.p. 216°–8°C.

Anal. Calcd. for $C_{15}H_{23}N_3O_2 \cdot HCl$: C, 57.42; H, 7.66; N, 13.40.

Found: C, 57.06; H, 7.68; N, 13.19.

EXAMPLE XIX 2-(α-N-isopropylaminoethyl)-6-methyl-0b 7-nitro-1,2,3,4-tetrahydroquinoline 1. A mixture of 2-acetyl-6-methylquinoline (4.0 g., 0.072 mole), prepared by the method of Campbell et al., [J.A.C.S., 68, 1840 (1946)], and isopropylamine (5.9 g., 0.1 mole) in methanol (120 ml.) is catalytically hydrogenated over Raney nickel (2.3 g.) at room temperature (25°C.) and 1,800 p.s.i. until uptake of hydrogen ceased. The catalyst is removed by means of filtration and evaporation of the solvent yielded a brown mobile oil, which is fractionated to give 3.4 g. of 2-(α-N-isopropylaminoethyl)-6-methylquinoline, b.p. 112°C./0.5 mm. Hg.

2. 2.5 G. (0.011 mole) of the product of (2) is hydrogenated as in Example VIII (2) and fractionally distilled to yield 2.3 g. of 2-(α-N-isopropylaminoethyl)-6-methyl 1,2,3,4-tetrahydroquinoline, b.p. 138°C./1.3 mm. Hg.

3. 1.5 G. (0.0061 mole) of the product of (3) is nitrated as in Example I (3). The dark red oily product is extracted into chloroform, dried and evaporated in vacuo to give a red oil, which is then converted to the hydrochloride salt by conventional means. Recrystallization from isopropanol/ether then gave 2-(α-N-isopropylaminoethyl)-6-methyl-7-nitro-1,2,3,4-tetrahydroquinoline hydrochloride, m.p. 139°C.

Anal. Calcd. for $C_{15}H_{24}N_3O_2 \cdot HCl \cdot 0.25 H_2O$: C, 56.61; H, 7.71; N, 13.27.

Found: C, 56.46; H, 7.35; N, 12.79.

EXAMPLE XX 2-(N,N-Diethylaminomethyl)-6-methyl-7-nitro-1,2,3,4-tetrahydroquinoline N-Oxide Monohydrate A mixture of the product of Example I (2.0 g., 0.0072 mole) and 30% hydrogen peroxide (3.0 ml., 0.0262 mole) in dry acetone (15 ml.) is stirred at room temperature for 3 days. A further quantity of 30% hydrogen peroxide (5.0 ml., 0.0436 mole) is added and the stirring continued for a further seven hours. The excess hydrogen peroxide is decomposed by the addition of platinum oxide, the resulting mixture filtered and the solvent removed in vacuo to give a viscous red liquid. Trituration with diethyl ether gives an orange powdery solid, which is then collected and recrystallized to yield 0.95 g. of 2-(N,N-diethylaminomethyl)-6-methyl-7- nitro-1,2,3,4-tetrahydroquinoline N-oxide monohydrate in the form of bright red crystals, m.p. 107°–11°C.

Anal. Calcd. for $C_{15}H_{23}N_3O_3 \cdot H_2O$: C, 57.80; H, 8.03; N, 13.50.

Found: C, 57.54; H, 7.78; N, 13.81.

EXAMPLE XXI

1-Ethyl-2-(N-ethyl-N-isopropylaminomethyl)-6-methyl-7-nitro-1,2,3,4-tetrahydroquinoline 1. 7.5 g. (0.0285 mole) of the product of Example VI(3) as free base (before treatment with sulphuric acid) is acetylated by the method of Example X(1) to give 1-acetyl-(2-N-acetyl-N-isopropylaminomethyl)-6-methyl-1,2,3,4-tetrahydroquinoline as a pale yellow viscous oil, which on trituration and cooling to −60°C. with low boiling petroleum ether yields 5.2 g. of an off-white solid, m.p. 69°C.

2. 5.10 g. (0.017 mole) of the product of (1) is reduced as in Example X(2) to give 3.0 g. of 1-ethyl-(2-N-ethyl-N-isopropylaminomethyl)-6-methyl-1,2,3,4-tetrahydroquinoline as a liquid, b.p. 124°–8°C./0.4 mm. Hg.

3. 2.25 g. (0.0082 mole) of the product of (2) is nitrated as in Example I(3) to give 2.5 g. of 1-ethyl-(2-N-ethyl-N-isopropylaminomethyl)-6-methyl-7-nitro-1,2,3,4-tetrahydroquinoline as a red mobile oil. The p-toluene sulfonate is isolated as in Example X(3), m.p. 150°C.

Anal. Calcd. for $C_{18}H_{29}N_3O_2 \cdot C_7H_8O_3S$: C, 61.10; H, 7.54; N, 8.55.

Found: C, 60.90; H, 7.55; N, 8.54.

EXAMPLE XXII

7-Cyano-2-isopropylaminomethyl-6-methyl-1,2,3,4-tetrahydroquinoline

1. The product of Example VI as a free base (31 g.) is treated with acetic anhydride (100 ml.) and then heated under reflux for 2.5 hours. The hot solution is then poured into 1 liter of water and allowed to stand for 2 hours to allow excess acetic anhydride to hydrolyze. The mixture is thereafter extracted into ether, dried and evaporated in vacuo. The resulting oil is poured into water, basified with potassium carbonate, and extracted into chloroform, dried and finally evaporated to a red oil. Trituration with diethyl ether gives a yellow solid, which is then filtered and dried to yield 28.0 g. of 1-acetyl-2-[N-acetyl-N-isopropylaminomethyl]-6-methyl-7-nitro-1,2,3,4-tetrahydroquinoline.

2. The product from (1) (25.0 g.) in absolute ethanol (600 ml.) is hydrogenated over 10% palladium on carbon (2.7 g.) at 100 p.s.i. at room temperature for 7 hours. Filtration and evaporation in vacuo then gives 1-acetyl-2-[N-acetyl-N-isopropylaminomethyl]-7-amino-6-methyl-1,2,3,4-tetrahydroquinoline as a yellow oil (18 g.), which is converted to the dihydrochloride salt by conventional means.

3. The product from (2) (6.0 g.) is dissolved in a mixture of concentrated hydrochloric acid (4.3 ml.) and crushed ice (17 g.) and stirred at 3°C., whilst a 30% sodium nitrite solution is added dropwise until excess nitrite ions are present. This stirred diazonium salt solution is then neutralized by the addition of solid potassium carbonate and thereafter added to cuprous cyanide solution covered by a layer of toluene, which is efficiently stirred to draw the solvent into the mixture and kept at 0°–3°C. After stirring for 30 minutes at 0°C., the mixture is allowed to come to room temperature and then heated to 50°C., (without stirring), for a period of 30 minutes. The toluene is next separated from the cooled product and subsequently evaporated in vacuo to a black oil, which on dissolving in diethyl ether and heating with 40°–60°C. petroleum ether yields 1-acetyl-2-[N-acetyl-N-isopropylaminomethyl]-7-cyano-6-methyl-1,2,3,4-tetrahydroquinoline as a buff powder (2.9 g., m.p. 120°C.).

4. The product from (3) (1.5 g.) is refluxed for one hour with 50% V/V hydrochloric acid (15 ml.), cooled and basified with potassium carbonate and then extracted into chloroform. Evaporation in vacuo affords 7-cyano-2-isopropylaminomethyl-6-methyl-1,2,3,4-tetrahydroquinoline as a red oil (650 mg.), which is then converted to the maleate salt (m.p. 190°C.) by conventional means.

Anal. Calcd. for $C_{15}H_{21}N_3 \cdot C_4H_4O_4$: C, 63.49; H, 7.01; N, 11.69.

Found: C, 63.22; H, 6.87; N, 11.85.

EXAMPLE XXIII

7-Bromo-2-isopropylaminomethyl-6-methyl-1,2,3,4-tetrahydroquinoline 1. 1-Acetyl-2-[N-acetyl-N-isopropylaminomethyl]-7-amino-6-methyl-1,2,3,4-tetrahydroquinoline, prepared as in Example XXII (1) and (2) (5.07 g., 0.016 mole) in hydrobromic acid (40%, 9.9 ml.) is cooled to between 5 and 10°C. and powdered sodium nitrite (1.23 g.) is added portionwise, with shaking of the reaction mixture after each addition. After the final addition shaking is stopped when no more brown fumes are present, and by this stage a light brown precipitate will have formed. The mixture is allowed to come to room temperature during which time bubbles of nitrogen are observed evolving in the reaction solution. Copper bronze (0.053 g.) is added and the mixture, now purple in colour, is heated on a steam bath for one-half hour. The mixture is then cooled, water (20 ml.) is added, and the mixture basified with sodium hydroxide solution and extracted into chloroform. The chloroform solution is dried over magnesium sulphate and then evaporated down to an oil, which is triturated under diethyl ether at 60°C., yielding 1-acetyl-2-[N-acetyl-N-isopropylaminomethyl]-7-bromo-6-methyl-1,2,3,4-tetrahydroquinoline as a light brown solid (2.2 g.; m.p. ~96°C.).

2. The product from (1) (2.0 g.) is added to hydrochloric acid (50%, 20 ml.) and the mixture refluxed for 1 hour. The black mixture is poured into water, basified with sodium hydroxide solution, and extracted into chloroform. The chloroform solution is dried over magnesium sulphate and evaporated down to a red oil, which is dissolved in benzene and chromatographed down a neutral alumina column with an eluent initially comprising 10% chloroform in benzene and subsequently increasing in chloroform content until finally consisting of pure chloroform. When only a dark red band remains on the origin, the eluted solution is evaporated down to a red oil. The latter is taken up into diethyl ether, the solution filtered to remove sediment, and hydrogen chloride is passed through the ethereal filtrate, whereupon the hydrochloride salt is formed. This is collected by filtration and recrystallized from water, giving 7-bromo-2-isopropylaminomethyl-6-methyl-1,2,3,4-tetrahydroquinoline hydrochloride as off-white crystals (0.18 g.), m.p. 240°–1°C.

Anal. Calcd. for $C_{18}H_{25}BrN_2O_4 \cdot HCl$: C, 50.5; H, 6.36; N, 8.42.

Found: C, 50.19; H, 6.47; N, 8.18.

EXAMPLE XXIV

7-Fluoro-2-isopropylaminomethyl-6-methyl-1,2,3,4-tetrahydroquinoline

1. A solution of 2-formyl-7-fluoro-6-methylquinoline (11.0 g.) and isopropylamine (5.8 g.) in absolute ethanol (50 ml.) is refluxed for a period of 2 hours. The resulting mixture is concentrated in vacuo to near dryness and the residue crystallized from aqueous ethanol to give 6.55 g. of 7-fluoro-2-isopropyliminomethyl-6-methyl-1,2,3,4-tetrahydroquinoline as a white crystalline solid, m.p. 103.5°–106°C. A second crystalline crop (4.7 g.) is then obtained by dilution of the mother biquor with water.

2. A stirred solution of 10.25 g. of the product of (1) in methanol (250 ml.) containing 5 drops of 5N aqueous sodium hydroxide is treated with sodium borohydride (10.25 g.), added in small portions over a period of 15 minutes. The resulting mixture is then stirred under reflux for a period of 3.5 hours, cooled and the excess borohydride slowly decomposed by the addition of 5N hydrochloric acid (50 ml.) thereto in a continuous manner. The treated solution is then concentrated in vacuo to near dryness and the residue obtained is subsequently dissolved in 100 ml. of water. This particular aqueous solution is thereafter basified with 5N sodium hydroxide and the resulting product extracted into diethyl ether. After drying the latter extract over magnesium sulfate, the product is obtained from the ethereal solution as the hydrochloride salt by passing dry hydrogen chloride gas through the solution. The product separated as a gummy solid, which later crystallized on standing. Recrystallization from ethanol then gave 11.5 g. of 7-fluoro-2 -isopropylaminomethyl-6-methylquinoline dihydrochloride, m.p. 215°–217°C. Nuclear magnetic resonance (n.m.r.) spectroscopy indicated the product to be a dihydrate.

3. A solution of 2 g. of the product of (2) in water (200 ml.) is shaken at room temperature under a pressure of 30 p.s.i. of hydrogen in the presence of Adams platinum oxide catalyst (80 mg.) for a period of 16 hours. The reaction mixture is then filtered to remove the catalyst and the filtrate basified with 5N aqueous sodium hydroxide. The resulting product (viz., 7-fluoro-2-isopropylaminomethyl-6-methyl-1,2,3,4-tetrahydroquinoline) is then extracted into ether, and the ether extract washed three times with water and dried over magnesium sulfate. The product is isolated as the hydrochloride salt by passing dry hydrogen chloride gas through the solution. Recrystallization of this salt from isopropanol then gave 0.4 g. of pure 7-fluoro-2-isopropylaminomethyl-6-methyl-1,2,3,4-tetrahydroquinoline hydrochloride as a white crystalline material.

Anal. Calcd. for $C_{14}H_{21}FN_2 \cdot HCl$: C, 61.6; H, 8.13; N, 10.30.

Found: C, 61.7; H, 8.03; N, 10.08.

EXAMPLE XXV

7-Fluoro-2-($\beta$-hydroxyethyl)aminomethyl-6-methyl-1,2,3,4-tetrahydroquinoline 1. and 2. Using 2-formyl-7-fluoro-6-methylquinoline (3.0 g.) and ethanolamine (1.4 g.) as starting materials, 7-fluoro-2-($\beta$-hydroxyethyl)-aminomethyl-6-methyl-1,2,3,4-tetrahydroquinoline is prepared in the manner of Example XXIV (1) and (2), except for the fact that it is not isolated as the hydrochloride salt. The free base is obtained as a white powder, which is subsequently recrystallized from 60°/80°C. petroleum ether containing a little methanol to afford white fluffy needles of the pure product, m.p. 83°–84°C.

3. A solution of 1.2 g. of the product of (2) and 2 ml. of 5N hydrochloric acid in methanol (100 ml.) is hydrogenated over Raney nickel (0.5 ml.) at 75°C. and 750 p.s.i. pressure for a period of 15 minutes. The resulting reaction mixture is then filtered and the methanolic filtrate subsequently basified with 5N aqueous sodium hydroxide, followed by extraction of the desired product into diethyl ether. After drying the ether extract over magnesium sulfate and then evaporating same under reduced pressure, there is obtained a residual brown gum which on treatment with 60°/80°C. petroleum ether containing a little methanol and subsequent cooling to −5°C. gave a 0.4 g. yield of 7-fluoro-2-($\beta$-hydroxyethyl)-aminomethyl-6-methyl-1,2,3,4-tetrahydroquinoline, in the form of a fawn-colored solid, m.p. 91°–92°C.

Anal. Calcd. for $C_{13}H_{19}FN_2O$: C, 65.54; H, 7.98; N, 11.77.

Found: C, 65.59; H, 7.71; N, 11.01.

EXAMPLE XXVI

2-Diethylaminomethyl-7-fluoro-6-methyl-1,2,3,4-tetrahydroquinoline 1. 2,6-Dimethyl-7-fluoroquinoline (15.0 g.) is chlorinated in the manner of Example VI (1) to give 7.2 g. of 2-chloromethyl-7-fluoro-6-methylquinoline, m.p. 95°C.

2. A solution of 7.0 g. of the product from (1) is refluxed with diethylamine (5.25 g.) in absolute ethanol (70 ml.) for a period of three hours. The resulting mixture is then evaporated to near dryness under reduced pressure, water (50 ml.) is added to the solid residue and 5N aqueous sodium hydroxide solution (3 ml.) is thereafter introduced in order to ensure complete basification. This aqueous solution is then extracted with diethyl ether, the ether extracts dried and subsequently evaporated under reduced pressure to give an oil, and the latter substance purified by means of column chromatography, using a silica column, to afford 2.4 g. of 2-diethylaminomethyl-7-fluoro-6-methylquinoline as a red mobile oil. Conversion to the dihydrochloride salt by conventional means then gave 2-diethylaminomethyl-7-fluoro-6-methylquinoline dihydrochloride, m.p. 208°–212°C.

3. A solution of 1.5 g. of the product of (2) in methanol (100 ml.) is catalytically hydrogenated over Raney nickel at 75°C. and 750 p.s.i. pressure for a period of 15 minutes. The resulting reaction mixture is then cooled, filtered and subsequently evaporated under reduced pressure to give a green oil. The latter oil is then taken up in dilute hydrochloric acid, the resulting solution filtered and basified with 2N aqueous sodium hydroxide, followed by extraction of the aqueous solution with diethyl ether. Evaporation of the dried ether extracts in the usual manner then gave 2-diethylaminomethyl-7-fluoro-6-methyl-1,2,3,4-tetrahydroquinoline in the form of a yellow oil (1.0 g.). Conversion to the dihydrochloride salt is then accomplished by conventional means to give 2-diethylaminomethyl-7-fluoro-6-methyl-1,2,3,4-tetrahydroquinoline dihydrochloride, m.p. 172°C. after recrystallization from ethyl acetate-methanol.

Anal. Calcd. for $C_{15}H_{23}FN_2.2HCl$: C, 55.72; H, 7.74; N, 8.67.

Found: C, 56.03; H, 7.92; N, 8.30.

EXAMPLE XXVII

6-Hydroxymethyl-2-isopropylaminomethyl-7-nitro-1,2,3,4-tetrahydroquinoline

1. Four fermenters are set up, each one of which contained 2.0 liters of the following medium, sterilized for thirty-five minutes at 15 p.s.i., respectively:

| | |
|---|---|
| Soybean meal | 5 g. |
| Glucose | 20 g. |
| NaCl | 5 g. |
| $K_2HPO_4$ | 5 g. |
| Yeast Extract | 5 g. |
| Tap water to | 1 liter |
| pH adjusted with sulfuric acid to 6.5 | |

The fermenters are inoculated with 7.5% by volume of a twenty-four hour old culture of *Aspergillus sclerotiorum Huber* grown at 28°C. in 50 ml. aliquots of the above described soybean-glucose medium contained in 300 ml. Erlenmeyer flasks, placed on a shaker rotating at approximately 230 r.p.m. The inoculated fermenters are agitated at 1,380 r.p.m. and each aerated with 1 liter of air per minute and at a temperature of 28°C. for 47 hours. A silicone antifoam is added when required. At the end of the 47-hour period, the pH of the fermentation broth rose to 6.8 – 6.9. Sulfuric acid is then added with sterile precautions to restore the pH to 6.5.

2. 0.75 G. of the product of Example VI as hydrogen maleate, dissolved in 75 ml. of sterile water, is added to each of the four fermenters and agitation and aeration are continued for a further 23 hours. The whole fermentation broths from each fermenter are pooled, the pH adjusted to 8.0 with sodium hydroxide and the 8.2 liters of fermentation broth thus obtained are extracted by agitating vigorously with 16.4 liters of methylene chloride for ten minutes. The solvent extract is then dried over anhydrous sodium sulfate and subsequently evaporated to dryness at a temperature below 40°C. (dry weight 5.567 g.).

3. The dark brown residue from (2) is extracted four times with methanol at room temperature, decanting the solution from the insoluble material. The combined methanol extracts, total volume about 200 ml., are then filtered and treated with 3 g. of sodium borohydride, added in portions over a period of 30 minutes with stirring, to reduce any 6-formyl compound present to the 6-hydroxymethyl compound. The methanol solution is then allowed to stand overnight at room temperature and is thereafter diluted with 1 liter of ether. The solution is washed 4 times with 500 ml. of water and the resulting pale yellow ethereal solution is dried over magnesium sulfate. The ether is next removed by vacuum distillation from a water bath at 40°C. The residue is dissolved in about 75 ml. of iso-propanol at 50°C., filtered to remove any insoluble particles and cooled overnight in the refrigerator. The product is collected and dried in vacuo to yield 0.5 g. of 6-hydroxymethyl-2-isopropylaminomethyl-7-nitro-1,2,3,4-tetrahydroquinoline as pale yellow crystals of m.p. 147°–9°C. A further 0.5 g. of crude material is obtained from the mother liquors of the recrystallization. Total yield is therefore 1.0 g. (0.0036 mole) from 3.0 g. (0.0079 mole) of starting material, i.e. 45% of the theoretical amount.

Anal. Calcd. for $C_{14}H_{21}N_3O_3$: C, 60.15; H, 7.58; N, 15.04.

Found: C, 59.93; H, 7.84; N, 14.82.

EXAMPLE XXVIII

By similar procedures to those described in Example XXVII, the products of Example I (free base) and Example XV (as hydrochlorides) are converted to the corresponding 6-hydroxymethyl compounds and isolated as (A) 2-diethylaminomethyl-6-hydroxymethyl-7-nitro-1,2,3,4-tetrahydroquinoline (m.p. 89°–91°C.), (B) 2-n-butylaminomethyl-7-chloro-6-hydroxymethyl-1,2,3,4-tetrahydroquinoline (m.p. 117°–8°C.) and (C) 7-chloro-6-hydroxymethyl-2-isopropylaminomethyl-1,2,3,4-tetrahydroquinoline (m.p. 131°–2°C.), respectively.

A. Anal. Calcd. for $C_{15}H_{23}N_3O_3.0.5H_2O$: C, 59.58; H, 8.00; N, 13.90.

Found: C, 60.31; H, 7.68; N, 13.39.

B. Anal. Calcd. for $C_{15}H_{23}ClN_2$: C, 63.7; H, 8.3; N, 9.9.

Found: C, 63.55; H, 8.4; N, 10.03.

C. Anal. Calcd. for $C_{15}H_{23}N_2OCl$: C, 62.5; H, 7.82; N, 10.43.

Found: C, 62.68; H, 7.74; N, 10.12.

EXAMPLE XXIX 2-(N-tert.-Butylaminomethyl)-6-hydroxymethyl-7-nitro-1,2,3,4-tetrahydroquinoline By a similar procedure to that described in Example XXVII, the product of Example VIII (as its methane sulfonate salt) is converted to the corresponding 6-hydroxymethyl compound and isolated as 2-(N-tert.-butylaminomethyl)-6-hydroxymethyl-7-nitro-1,2,3,4-tetrahydroquinoline. This is subsequently converted to its maleate salt (m.p. 163°–4°C.).

Anal. Calcd. for $C_{15}H_{23}N_3O_3.C_4H_4O_4$: C, 55.74; H, 6.60; N, 10.27.

Found: C, 55.47; H, 6.54; N, 9.37.

EXAMPLE XXX

2-Diethylaminomethyl-6-formyl-7-nitro-1,2,3,4-tetrahydroquinoline

2-Diethylaminomethyl-6-hydroxymethyl-7-nitro-1,2,3,4-tetrahydroquinoline, prepared as in Example XXVIII (1.0 g.) and active manganese dioxide (2.0 g.) are added to dry benzene (15 ml.) and the mixture is refluxed for about 24 hours, during which time an additional amount of manganese dioxide (1.0 g.) is added at a late stage.

The mixture is filtered and the filtrate evaporated in vacuo to an orange oil, which solidifies on cooling. The orange solid (0.39 g.), which is found to be quite pure, is 2-diethylaminomethyl-6-formyl-7-nitro-1,2,3,4-tetrahydroquinoline, m.p. 80°–82°C.

Anal. Calcd. for $C_{15}H_{21}N_3O_3$: C, 61.84; H, 7.27; N, 14.42.

Found: C, 61.66; H, 7.26; N, 14.53.

EXAMPLE XXXI

6-Formyl-2-isopropylaminomethyl-7-nitro-1,2,3,4-tetrahydroquinoline

6-Formyl-2-isopropylaminomethyl-7-nitro-1,2,3,4-tetrahydroquinoline (m.p. 94°–5°C.) is prepared similarly to the product of Example XXX with the slight modification in that the starting materials in which the hydroxymethyl compound is the product of Example XXVII are stirred at room temperature for 6 hours instead of being refluxed together for 24 hours. Also, it is crystallized out from a benzene-petrol ether solution after separation from brown oil present after the addition of solvent to the original oil (produced on evaporation of the reaction filtrate).

Anal. Calcd. for $C_{14}H_{19}N_3O_3$: C, 60.63; H, 6.91; N, 15.15.

Found: C, 60.27; H, 6.60; N, 14.44.

EXAMPLE XXXII

7-Bromo-2-(β-hydroxyethyl)aminomethyl)-6-methyl-1,2,3,4-tetrahydroquinoline

The procedure described in Example XXV is repeated except that 2-formyl-7-bromo-6-methylquinoline is the ultimate starting material employed rather than the corresponding 7-fluoro compound. In this particular case, the corresponding final product thus obtained is 7-bromo-2-(β-hydroxyethyl)aminomethyl-6-methyl-1,2,3,4-tetrahydroquinoline, isolated as the free base.

EXAMPLE XXXIII

7-Chloro-2-(2-hydroxyethylaminomethyl)-6-methyl-1,2,3,4-tetrahydroquinoline

A mixture of 7-chloro-2-formyl-6-methylquinoline (4.08 g., 0.02 mole) and ethanolamine (1.22 g., 0.02 mole) in absolute ethanol (75 ml.) is warmed for 1½ hours and then diluted to 250 ml. with fresh ethanol. The mixture is added to pre-hydrogenated Adam's catalyst (platinum oxide) in absolute ethanol (150 ml.) and the whole hydrogenated at room temperature and 50 p.s.i.

To the mixture is added 1:1 glacial acetic acid: absolute ethanol (10 ml.) and the resulting mixture rehydrogenated at room temperature and 36 p.s.i., after which it is filtered and the filtrate concentrated by evaporation and poured into water (200 ml.). The aqueous solution is basified with 5N sodium hydroxide solution and extracted with chloroform, the organic solution then being dried over magnesium sulfate and evaporated in vacuo to dryness. The residue is recrystallized from ethyl acetate, yielding 3.5 g. 7-chloro-2-(2-hydroxyethylaminomethyl)-6-methyl-1,2,3,4-tetrahydroquinoline, m.p. 92°–3°C.

Anal. Calcd. for $C_{13}H_{19}ClN_2O$: C, 61.3; H, 7.52; N, 11.00.

Found: C, 61.45; H, 7.34; N, 11.08.

EXAMPLE XXXIV

1-Ethyl-2-isopropylaminomethyl-6-methyl-7-nitro-1,2,3,4-tetrahydroquinoline

1. To 2-isopropylaminomethyl-6-methyl-1,2,3,4-tetrahydroquinoline (51.8 g.) dissolved in dry benzene (100 ml.) is added a solution of acetic anhydride (23.3 g., 21.6 ml., 1 equivalent) in dry benzene (100 ml.). An exothermic reaction results, and the reaction mixture is allowed to stand at room temperature for 24 hours. The solution is then poured into 1N sodium hydroxide solution, the mixture shaken well, and the benzene layer removed and evaporated down to an oil. The latter is found not to crystallize on trituration in cooled petrol ether, and so is distilled in vacuo. Of the four fractions collected the final one is the purest, but consists of 83% mono-acetyl compound and 17% diacetyl compound according to gas liquid chromatography evidence. The oil is taken up into 1N hydrochloric acid and extracted with diethyl ether to remove the unwanted diacetyl component. The aqueous solution is basified with 1N sodium hydroxide cooled with ice, and extracted with diethyl ether. Thin layer chromatography evidence suggests that most of the diacetyl component has been removed, the product consisting principally of 2-(N-acetylisopropylaminomethyl)-6-methyl-1,2,3,4-tetrahydroquinoline.

2. The product of (1) (10 g.) and ethyl bromide (4.2 g., 2.9 ml., 1 equivalent) are heated together with stirring in an oil bath at 120°C. for several hours. The reaction mixture is taken up into water and extracted with diethyl ether, the ethereal solution then being evaporated down to yield a product A which is quite pure from gas liquid chromatography evidence. A further amount of acetyl compound from (1) (15 g.) and ethyl bromide (6.3 g., 4.3 ml.) are heated together with stirring for several hours and the reaction mixture is extracted with chloroform. The aqueous layer is basified with sodium hydroxide solution and re-extracted with chloroform, the organic solution then being combined with the first and the total chloroform solution evaporated down to yield a product B. A and B are 2(N-acetyl-isopropylaminomethyl)-1-ethyl-6-methyl-1,2,3,4-tetrahydroquinoline.

3. The combined products A and B from (2) (15 g.) are taken up into absolute ethanol (20 ml.), water (20 ml.) and concentrated hydrochloric acid (20 ml.) and the whole is refluxed for 2 days, after which thin layer chromatography evidence suggests complete conversion. The reaction mixture is allowed to cool to room temperature, extracted with chloroform and the chloroform layer evaporated down to yield a product C (3.7 g.). Basification of the aqueous layer with 5N sodium hydroxide solution followed by chloroform extraction and evaporation of the chloroform solution yields a product D (10.4 g.), which is found from thin layer chromatography evidence to be identical to the product C. Products C and D are combined and submitted to a distillation in vacuo, whereupon two fractions, b.p. 190°–200°C./0.6 mm. and b.p. 200°–206°C./0.6 mm. are collected. These are combined and triturated in petrol ether, yielding a solid (5.4 g.), 1-ethyl-2-isopropylaminomethyl-6-methyl-1,2,3,4-tetrahydroquinoline.

5. To the product of (4) (5 g.), dissolved with cooling in concentrated sulfuric acid (50 ml.), is added over one-half hour a solution of fuming nitric acid (1.28 g., 0.85 ml., 1 equivalent) in concentrated sulfuric acid (8.5 ml.) with ice/salt bath cooling, such that the temperature of the reaction mixture is kept between 0° and 3°C. The reaction mixture is stirred at 0°C. for 3 hours, quenched in a large volume of ice and water and basified with potassium carbonate. The resultant precipitate is filtered off and the filtrate extracted with diethyl ether, the ethereal solution then being dried over magnesium sulfate and evaporated down to an oil (4.5 g.). The latter is dissolved in isopropanol and a solution of maleic acid (2.0 g., 10% excess) in isopropanol added, resulting in the precipitation of 6.5 g. of solid, a mixture of the 5- and 7-nitro derivatives of the product of (4) as maleates. Two recrystallizations from an excessive amount of isopropanol yield 1.2 g. of solid, shown by gas liquid chromatography to be a 1:1 mixture of the 5-nitro and 7-nitro isomers. The mother liquors from the two recrystallizations are evaporated to dryness yielding 4.5 g. of the maleate salt, which is then basified. The free base (3 g.) is applied to a molecular still, whereupon a fraction enriched in the 7-nitro isomer (greater than 70% 7-nitro isomer) is isolated. Its maleate is prepared and recrystallized twice from methanol giving a product, m.p. 149°–150°C., which consists wholly of 1-ethyl-2-isopropylaminomethyl-6-methyl-7-nitro-1,2,3,4-tetrahydroquinoline maleate.

Anal. Calcd. for $C_{16}H_{25}N_3O_2 \cdot C_4H_4O_4$: C, 58.90; H, 7.12; N, 10.32.

Found: C, 59.31; H, 7.18; N, 10.84.

EXAMPLE XXXV

7-Chloro-6,8-dimethyl-2-(2-hydroxyethylaminomethyl)-1,2,3,4-tetrahydroquinoline

1. A solution of ethanolamine (2.4 g.) in ethanol (20 ml.) is added to a hot solution of 7-chloro-6,8-dimethyl-2-formylquinoline (8.0 g.) in ethanol (500 ml.) and the resulting dark solution is heated on a steam bath for one-half hour. After a period of cooling, the reaction solution deposits an off-white solid precipitate, 7-chloro-6,8-dimethyl-2-(2-hydroxyethyliminomethyl)-quinoline. This is recrystallized from methanol, yielding plates (6.8 g.), m.p. 122°–3°C.

Anal. Calcd. for $C_{14}H_{15}ClN_2O$: C, 64.00; H, 5.72; N, 10.67.

Found: C, 63.95; H, 5.90; N, 10.44.

2. A solution of the product of (1) (2.0 g.) in ethanol (150 ml.) is hydrogenated over Raney nickel catalyst (1 ml.) at 75°C. and at an initial pressure of 750 p.s.i. for 0.75 hour. The catalyst is then removed by filtration and the solution evaporated to yield a solid which is recrystallized from methanol, giving white needles (1.2 g.) of 7-chloro-6,8-dimethyl-2-(2-hydroxyethylaminomethyl)-1,2,3,4-tetrahydroquinoline, m.p. 109°–111°C.

Anal. Calcd. for $C_{14}H_{21}ClN_2O$: C, 62.57; H, 7.82; N, 10.43.

Found: C, 62.64; H, 7.70; N, 10.36.

EXAMPLE XXXVI

7-Chloro-6,8-dimethyl-2-isopropylaminomethyl-1,2,3,4-tetrahydroquinoline

1. A solution of 7-chloro-6,8-dimethyl-2-formyl-quinoline (11.0 g.) and isopropylamine (6.0 g.) in ethanol (300 ml.) is refluxed on a steam bath for 2 hours. The resultant dark red-brown solution is then evaporated to an oil, which is treated with 60°–80°C. petrol ether and left for about 12 hours at room temperature. The solid precipitate which has formed is filtered off and 1 g. of the total is recrystallized from 60°–80°C. petrol ether to yield 7-chloro-6,8-dimethyl-2-isopropyliminomethylquinoline as off-white crystals, m.p. 83°–4°C.

Anal. Calcd. for $C_{15}H_{17}ClN_2$: C, 69.10; H, 6.53; N, 10.75.

Found: C, 68.85; H, 6.83; N, 10.56.

The remainder of the crude product is combined with its mother liquor and the mixture evaporated in vacuo to yield 11 g. of crude solid product.

2. To a warm solution of the crude imino compound of (1) (11.0 g.) in methanol (100 ml.) is added slowly an aqueous methanolic solution of sodium borohydride (11.0 g.) over a period of 1½ hours. The solution is then refluxed for 2 hours and thereafter the cooled solution treated successively with 5N hydrochloric acid and 5N sodium hydroxide. The mixture is then extracted with ether and the ethereal solution dried over magnesium sulfate, after which the ethereal solution is evaporated in vacuo to yield a light brown mobile oil. Treatment of the latter with dry ethereal hydrogen chloride yields the off-white hydrochloride salt in powder form, m.p. 143°–4°C., yield 8.6 g. The product is characterized as the maleate salt of 7-chloro-6,8-dimethyl-2-isopropylaminomethyl-quinoline.

Anal. Calcd. for $C_{15}H_{19}ClN_2 \cdot C_4H_4O_4$: C, 60.20; H, 6.12; N, 7.39.

Found: C, 60.36; H, 6.12; N, 7.49.

3. The product of (2) as its hydrochloric salt (3.2 g.) is dissolved in methanol (150 ml.), and enough 5N hydrochloric acid to convert the salt to the dihydrochloride (1 ml.) is added. The solution is hydrogenated over Raney nickel (1.5 ml.) at 75°C. and 750 p.s.i. for one-half hour. With the catalyst removed, the green solution is evaporated to a green foam, which is dissolved in water, basified, and extracted with ether. The ethereal solution is dried over magnesium sulfate and evaporated to yield a mobil oil (2.7 g.). The latter is dissolved in ethyl acetate (20 ml.), and treated with a warm solution of maleic acid (1.2 g., 1 equivalent) in ethyl acetate (15 ml.), the resultant white precipitate then being filtered off and recrystallized from ethyl acetate containing a little methanol to yield yellow plates, m.p. 190°–191°C., yield 2.35 g. of 7-chloro-6,8-dimethyl-2-isopropylaminomethyl-1,2,3,4-tetrahydroquinoline.

Anal. Calcd. for $C_{15}H_{23}ClN_2 \cdot C_4H_4O_4$: C, 59.60; H, 7.06; N, 7.32.

Found: C, 59.94; H, 7.27; N, 7.24.

EXAMPLE XXXVII

6-Ethoxymethyl-2-isopropylaminomethyl-7-nitro-1,2,3,4-tetrahydroquinoline

A solution consisting of 1.0 g. of 6-hydroxymethyl-2-isopropylaminomethyl-7-nitro-1,2,3,4-tetrahydroquinoline dissolved in 50 ml. of ethanol is treated at ambient temperatures with an excess of saturated ethanolic hydrogen chloride. The resulting dark-red solution is then added to 500 ml. of dry diethyl ether, and the mixture obtained in this manner is thereafter triturated to afford a pale yellow solid. The latter material is subsequently recovered by means of suction filtration and recrystallization from ethanol to afford 0.45 g. of 6-ethoxymethyl-2-isopropylaminomethyl-7-nitro-1,2,3,4-tetrahydroquinoline as the hydrochloric salt, in the form of a pale yellow fluffy solid, m.p. 184°–185°C.

Anal. Calcd. for $C_{16}H_{25}N_3O_3 \cdot HCl$: C, 55.90; H, 7.57; N, 12.23.

Found: C, 55.99; H, 7.55; N, 12.54.

EXAMPLE XXXVIII

6-Ethoxymethyl-2-isopropylaminomethyl-7-nitro-1,2,3,4-tetrahydroquinoline

A warm solution consisting of 0.5 g. of 6-hydroxymethyl-2-isopropylaminomethyl-7-nitro-1,2,3,4-tetrahydroquinoline dissolved in 40 ml. of anhydrous toluene is saturated with dry hydrogen chloride gas to give the corresponding hydrochloride salt in the form of a yellow solid precipitate. The latter material is then recovered by means of suction filtration and washed thoroughly with dry diethyl ether, prior to heating under reflux conditions with an excess of ethanol. On cooling the latter alcoholic solution, there is obtained 0.25 g. of crystalline 6-ethoxymethyl-2-isopropylaminomethyl-7-nitro-1,2,3,4-tetrahydroquinoline hydrochloride, identical in every respect with the product of Example XXXVII.

EXAMPLE XXXIX

6-Methoxymethyl-2-isopropylaminomethyl-7-nitro-1,2,3,4-tetrahydroquinoline

The procedure described in Example XXXVIII is repeated using methanol instead of ethanol as the alkanol of choice. In this particular case, the corresponding final product thus obtained is 6-methoxymethyl-2-isopropylaminomethyl-7-nitro-1,2,3,4-tetrahydroquinoline, isolated as the hydrochloride salt, m.p. 184°–186°C.

Anal. Calcd. for $C_{15}H_{23}N_3O_3$: HCl: C, 54.60; H, 7.28; N, 12.76.

Found: C, 54.22; H, 7.49; N, 12.22.

EXAMPLE XL 6-n-Butoxymethyl-2-isopropylaminomethyl-7-nitro-1,2,3,4-tetrahydroquinoline To a warm solution consisting of 5 g. of 6-hydroxymethyl-2-isopropylamiomethyl-7-nitro-1,2,3,4-tetrahydroquinoline in 250 ml. of n-butanol, there are added 1.72 g. of methanesulforic acid dissolved in 20 ml. of n-butanol. The resulting alcoholic solution is then heated under reflux for a period of 24 hours, with the course of the reaction being followed by means of thin layer chromatography in order to ascertain the final degree of completeness. Upon completion of this step, the spent reaction mixture is concentrated in vacuo to a total volume of 50 ml., basified with aqueous sodium hydroxide solution to afford 6-n-butoxy-methyl-2-isopropylaminomethyl-7-nitro-1,2,3,4-tetrahydroquinoline base and thereafter extracted with diethyl ether. The ethereal extracts (containing the base) are then combined, washed with water and subsequently treated with a solution of maleic acid dissolved in n-butanol. The crystals which form at this point are quickly collected by means of suction filtration and further purified by means of recrystallization from n-butanol to give 5.0 g. of 6-n-butoxymethyl-2-isopropylaminomethyl-7-nitro-1,2,3,4-tetrahydroquinoline maleate, m.p. 159°–160°C.

Anal. Calcd. for $C_{18}H_{29}N_3O_3.C_4H_4O_4$: C, 58.55; H, 7.31; N, 9.31.

Found: C, 58.16; H, 7.39; N, 9.28.

EXAMPLE XLI 6-n-Propoxymethyl-2-isopropylaminomethyl-7-nitro-1,2,3,4-tetrahydroquinoline The procedure described in Example XL is repeated except that n-propanol is now employed as the alkanol reagent of choice rather than n-butanol. In this particular case, the corresponding final product thus obtained is 6-n-propoxymethyl-2-isopropylaminomethyl-7-nitro-1,2,3,4-tetrahydroquinoline, isolated as the maleate salt, m.p. 157°C.

Anal. Calcd. for $C_{17}H_{27}N_3O_3.C_4H_4O_4$: C, 57.66; H, 7.15; N, 9.61.

Found: C, 57.84; H, 7.36; N, 9.04.

EXAMPLE XLII

6-Isopropoxymethyl-2-isopropylaminomethyl-7-nitro-1,2,3,4-tetrahydroquinoline

The procedure described in Example XL is repeated except that isopropanol is now employed as the alkanol reagent of choice rather than n-butanol. In this particular case, the corresponding final product thus obtained is 6-isopropoxymethyl-2-isopropylaminomethyl-7-nitro-1,2,3,4-tetrahydroquinoline, isolated as the maleate salt, m.p. 168°C.

Anal. Calcd. for $C_{17}H_{27}N_3O_3.C_4H_4O_4$: C, 57.66; H, 7.15; N, 9.61.

Found: C, 57.45; H, 7.16; N, 9.94.

EXAMPLE XLIII 6-n-Hexyloxymethyl-2-isopropylaminomethyl-7-nitro-1,2,3,4-tetrahydroquinoline The procedure described in Example XL is repeated except that n-hexanol is now employed as the alkanol reagent of choice rather than n-butanol. In this particular case, the corresponding final product thus obtained is 6-n-hexyloxymethyl-2-isopropylaminomethyl-7-nitro-1,2,3,4-tetrahydroquinoline, isolated as the free base compound.

EXAMPLE XLIV

2-Diethylaminomethyl-6-methoxymethyl-7-nitro-1,2,3,4-tetrahydroquinoline

The procedure described in Example XL is followed except that 2-diethylaminomethyl-6-hydroxymethyl-7-nitro-1,2,3,4-tetrahydroquinoline and methanol are the reactants employed, and 2-diethylaminomethyl-6-methoxymethyl-7-nitro-1,2,3,4-tetrahydroquinoline is the corresponding final product thus obtained. The product is ultimately isolated as the maleate salt after conversion by conventional means.

EXAMPLE XLV

2-Diethylaminomethyl-6-isopropoxymethyl-7-nitro-1,2,3,4-tetrahydroquinoline

The procedure described in Example XL is followed except that 2-diethylaminomethyl-6-hydroxymethyl-7-nitro-1,2,3,4-tetrahydroquinoline and isopropanol are the reactants employed, and 2-diethylaminomethyl-6-isopropoxymethyl-7-nitro-1,2,3,4-tetrahydroquinoline is the corresponding final product thus obtained. In this particular instance, the product is isolated as the free base compound.

EXAMPLE XLVI

2-Diethylaminomethyl-6-n-hexyloxymethyl-7-nitro-1,2,3,4-tetrahydroquinoline

The procedure described in Example XL is followed except that 2-diethylaminomethyl-6-hydroxymethyl-7-nitro-1,2,3,4-tetrahydroquinoline and n-hexanol are the reactants employed, and 2-diethylaminomethyl-6-n-hexyloxymethyl-7-nitro-1,2,3,4-tetrahydroquinoline is the corresponding final product thus obtained. The product is ultimately isolated as the maleate salt after conversion by conventional means.

EXAMPLE XLVII

2-n-Butylaminomethyl-7-chloro-6-ethoxymethyl-1,2,3,4-tetrahydroquinoline

The procedure described in Example XL is followed except that 2-n-butylaminomethyl-7-chloro-6-hydroxymethyl-1,2,3,4-tetrahydroquinoline and ethanol are the reactants employed, and 2-n-butylaminomethyl-7-chloro-6-ethoxymethyl-1,2,3,4-tetrahydroquinoline is the corresponding final product thus obtained. The product is ultimately isolated as the hydrochloric salt after conversion by conventional means.

EXAMPLE XLVIII

7-Chloro-6-isopropoxymethyl-2-isopropylaminomethyl-1,2,3,4-tetrahydroquinoline The procedure described in Example XL is followed except that 7-chloro-6-hydroxymethyl-2-isopropylaminomethyl-1,2,3,4-tetrahydroquinoline and isopropanol are the reactants employed, and 7-chloro-6-isopropoxymethyl-2-isopropylaminomethyl-1,2,3,4-tetrahydroquinoline is the corresponding final product thus obtained. The product is ultimately isolated as the maleate salt after conversion by conventional means.

EXAMPLE XLIX

The antischistosomal activity of the herein disclosed compounds is established by the technique described by O. D. Standen in "Experimental Chemotherapy" (editors R. J. Schnitzer and F. Hawking), Volume I, pp. 752–3. Their effectiveness against *Schistosoma mansoni* in mice and monkeys is tabulated hereinbelow:

I. Assessment in Mice:

Table A

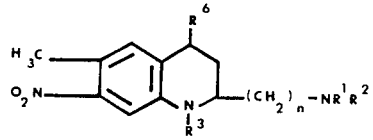

| $R^1$ | $R^2$ | $R^3$ | n | $R^6$ | Activity in Mice Multiple Dose | Single Dose |
|---|---|---|---|---|---|---|
| H | H | H | 1 | H | + | |
| $C_2H_5$ | H | H | 1 | H | +++ | +++ |
| n-$C_3H_7$ | H | H | 1 | H | ++ | |
| n-$C_4H_9$ | H | H | 1 | H | + | |
| iso-$C_3H_7$ | H | H | 1 | H | +++++ | +++++ |
| tert.-$C_4H_9$ | H | H | 1 | H | ++++ | |
| sec.-$C_4H_9$ | H | H | 1 | H | +++ | + |
| iso-$C_4H_9$ | H | H | 1 | H | ++ | |
| cyclopropyl | H | H | 1 | H | +++ | |
| $C_2H_5$ | $C_2H_5$ | H | 1 | H | ++++ | +++ |
| -$CH_2CH_2$-O-$CH_2CH_2$- | | H | 1 | H | + | |
| -$CH_2CH_2CH_2CH_2$- | | H | 1 | H | + | |
| $C_2H_5$ | $C_2H_5$ | $C_2H_5$ | 1 | H | ++ | |
| $C_2H_5$ | $C_2H_5$ | $CH_3$ | 1 | H | ++ | |
| $C_2H_5$ | H | $C_2H_5$ | 1 | H | ++++ | ++ |
| $C_2H_5$ | $C_2H_5$ | H | 2 | H | + | |
| iso-$C_3H_7$ | $CH_3$ | H | 1 | H | +++ | |
| iso-$C_3H_7$ | $C_2H_5$ | $C_2H_5$ | 1 | H | + | |
| $C_2H_5$ | $C_2H_5$ | H | 1 | $CH_3$ | + | |
| n-$C_4H_9$ | H | H | 1 | $CH_3$ | + | |
| iso-$C_3H_7$ | H | $C_2H_5$ | 1 | H | + | |
| $C_2H_5$ | $C_2H_5$ | H | 1 | H | + | |
| [N-oxide] | | | | | | |

Table B

| Structure | Activity in Mice Multiple Dose | Single Dose |
|---|---|---|
| 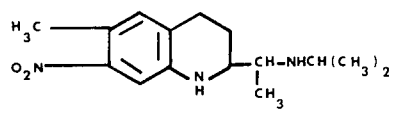 | + | |
| 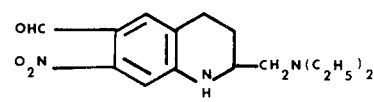 | + | |

Table C

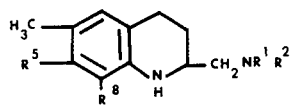

| $R^1$ | $R^2$ | $R^5$ | $R^8$ | Activity in Mice Multiple Dose | Single Dose |
|---|---|---|---|---|---|
| $C_2H_5$ | $C_2H_5$ | Cl | h | + | + |
| iso-$C_3H_7$ | H | Cl | H | ++ | |
| n-$C_4H_9$ | H | Cl | H | ++ | |
| iso-$C_3H_7$ | H | CN | H | +++ | ++ |
| iso-$C_3H_7$ | H | Br | H | + | |
| iso-$C_3H_7$ | H | F | H | ++ | + |
| iso-$C_3H_7$ | H | Cl | $CH_3$ | + | |

Table D

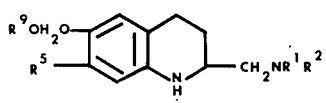

| $R^1$ | $R^2$ | $R^5$ | $R^9$ | Activity in Mice Multiple Dose | Single Dose |
|---|---|---|---|---|---|
| $C_2H_5$ | $C_2H_5$ | $NO_2$ | H | ++ | |
| iso-$C_3H_7$ | H | $NO_2$ | H | +++++ | ++++ |
| tert.-$C_4H_9$ | H | $NO_2$ | H | | +++ |
| n-$C_4H_9$ | H | Cl | H | ++(i.p.) | |
| iso-$C_3H_7$ | H | Cl | H | + | |
| iso-$C_3H_7$ | H | $NO_2$ | $CH_3$ | | ++ |
| iso-$C_3H_7$ | H | $NO_2$ | $C_2H_5$ | | ++++ |
| iso-$C_3H_7$ | H | $NO_2$ | n-$C_3H_7$ | | + |
| iso-$C_3H_7$ | H | $NO_2$ | iso-$C_3H_7$ | | ++ |

Ratings
+ very low activity
++ low activity
+++ moderate activity
++++ high activity
+++++ very high activity
- all at dosage employed
(i.p.) = intraperitoneal dosage; otherwise all dosages are oral

What is claimed is:
1. A compound of the formula

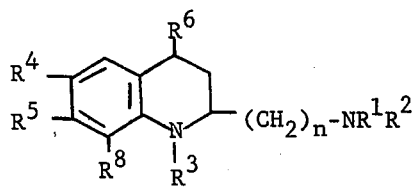

and the pharmaceutically accpetable mono-acid addition salts thereof, wherein $R^1$ and $R^2$, when taken separately, are each selected from the group consisting of hydrogen, alkyl having from 1 to 5 carbon atoms, $\beta$-hydroxyethyl and cycloalkyl having from 3 to 6 carbon atoms; $R^1$ and $R^2$, when taken together, complete a ring selected from the group consisting of pyrrolidino, piperidino and morpholino; $R^3$ is selected from the group consisting of hydrogen, methyl and ethyl; $R^4$ is alkoxymethyl having from 1 to 6 carbon atoms in the alkoxy moiety; $R^5$ is selected from the group consisting of nitro, cyano, fluorine, chlorine and bromine; $R^6$ is hydrogen or methyl; $R^8$ is hydrogen or methyl, and $n$ is 1 or 2, and the N-oxides of said base compounds wherein $R^1$ and $R^2$, when taken separately, are each other than hydrogen.

2. A compound as claimed in claim 1 wherein $R^3$ is hydrogen, $R^5$ is nitro, $R^6$ is hydrogen, $R^8$ is hydrogen, and $n$ is 1.

3. A compound as claimed in claim 2 wherein $R^1$ and $R^2$ are each ethyl.

4. A compound as claimed in claim 2 wherein $R^1$ is isopropyl and $R^2$ is hydrogen.

5. A compound as claimed in claim 4 wherein $R^4$ is methoxymethyl.

6. A compound as claimed in claim 4 wherein $R^4$ is ethoxymethyl.

7. A compound as claimed in claim 4 wherein $R^4$ is isopropoxymethyl.

* * * * *